US011196557B2

(12) United States Patent
Chen et al.

(10) Patent No.: US 11,196,557 B2
(45) Date of Patent: Dec. 7, 2021

(54) TOKEN DEVICE FOR CONDUCTING CRYPTOGRAPHY KEY BACKUP OR RESTORATION OPERATION

(71) Applicant: KeyXentic Inc., Hualien (TW)

(72) Inventors: Jia-Hong Chen, Taichung (TW);
Po-Yueh Hung, New Taipei (TW)

(73) Assignee: KEYXENTIC INC., Hualien (TW)

( * ) Notice: Subject to any disclaimer, the term of this patent is extended or adjusted under 35 U.S.C. 154(b) by 238 days.

(21) Appl. No.: 16/511,751

(22) Filed: Jul. 15, 2019

(65) Prior Publication Data
US 2020/0028681 A1 Jan. 23, 2020

(30) Foreign Application Priority Data
Jul. 17, 2018 (CN) .......................... 201810782319.2

(51) Int. Cl.
*H04L 29/06* (2006.01)
*H04L 9/08* (2006.01)
*H04L 9/32* (2006.01)

(52) U.S. Cl.
CPC .......... *H04L 9/0897* (2013.01); *H04L 9/3231* (2013.01)

(58) Field of Classification Search
CPC . H04L 9/0897; H04L 9/3231; H04L 63/0861; H04L 2209/38; H04L 9/3239; H04L 2209/805; H04L 9/0894; H04L 9/3234
See application file for complete search history.

(56) References Cited

U.S. PATENT DOCUMENTS

| 6,850,252 | B1 * | 2/2005 | Hoffberg | G06K 9/00369 |
| | | | | 348/E7.061 |
| 2012/0131657 | A1 * | 5/2012 | Sunstein | G06F 21/32 |
| | | | | 726/6 |
| 2015/0286698 | A1 * | 10/2015 | Gagnier | G06F 3/04842 |
| | | | | 707/736 |
| 2018/0303667 | A1 * | 10/2018 | Peyman | A61B 34/35 |
| 2020/0066405 | A1 * | 2/2020 | Peyman | G06N 3/08 |

OTHER PUBLICATIONS

Notice of Allowance issued in Taiwanese Counterpart Patent Application No. 107124687, dated May 16, 2019.

* cited by examiner

*Primary Examiner* — Mahfuzur Rahman
(74) *Attorney, Agent, or Firm* — Birch, Stewart, Kolasch & Birch, LLP

(57) ABSTRACT

A token device includes: a transmission interface for receiving power from an external device; a physiological characteristic detecting circuit for detecting user's touch actions and physiological characteristics (i.e., biometric characteristics); a smart card accessing circuit for detecting user's card-placing actions and for accessing an on-card secure chip on a smart card; an on-token secure chip; and a control circuit for generating an user identification data corresponding to the detecting result of the physiological characteristic detecting circuit, for respectively transmitting the user identification data to the on-token secure chip and the on-card secure chip for verifying user's identity. If the user's identity is confirmed by both the on-token secure chip and the on-card secure chip, the control circuit would conduct corresponding key backup operations or key restoration operations between the on-token secure chip and the on-card secure chip.

24 Claims, 10 Drawing Sheets

TOKEN DEVICE FOR CONDUCTING CRYPTOGRAPHY KEY BACKUP OR RESTORATION OPERATION

CROSS-REFERENCE TO RELATED APPLICATIONS

This application claims the benefit of priority to Patent Application No. 201810782319.2, filed in China on Jul. 17, 2018; the entirety of which is incorporated herein by reference for all purposes.

BACKGROUND

The disclosure generally relates to a cryptography key backup and restoration operation and, more particularly, to a token device for conducting cryptography key backup or restoration operation.

With the development of various applied information technologies, cryptography keys, such as signature keys, encryption keys, or the like, have become more and more popular. Consequently, the demand for the cryptography key backup significantly increases.

For example, in a related system of the Internet of Things (IoT), various cryptography key mechanisms are typically employed to verify the identity of the device, or to conduct signature encryption to the data, so as to ensure that the data cannot be tampered during the transmission between the IoT devices. Once the related cryptography key of the IoT system is lost, it has to take a lot of time to redeploy the cryptography key in numerous related devices, or else it will result in information security flaws in the whole IoT system.

For another example, in various cryptocurrency applications, such as the Bitcoin, the Ether, the Ripple, the Litecoin, or the like, cryptocurrencies can be stored in users' private storage devices in the form of a cryptography key, so that the users can preserve by themselves. However, once the cryptography keys preserved by users are lost or damaged, it may cause considerable economic lost.

SUMMARY

In view of the foregoing, it may be appreciated that a substantial need exists for methods and, apparatuses that mitigate or reduce the problems above.

An example embodiment of a token device of a cryptography key backup device is disclosed, comprising: a transmission interface arranged to operably receive power required for operations of the token device from an external device; a physiological characteristic detecting circuit arranged to operably detect user's touch actions and the user's physiological characteristics; a smart card accessing circuit arranged to operably detect user's card-placing actions, and arranged to operably access an on-card secure chip positioned on a smart card, wherein the on-card secure chip comprises a built-in on-card secure memory; an on-token secure chip comprising a built-in on-token secure memory; and a control circuit coupled with the transmission interface, the physiological characteristic detecting circuit, the smart card accessing circuit, and the on-token secure chip, and arranged to operably generate one or more user identification data corresponding to a detecting result of the physiological characteristic detecting circuit, to operably transmit a first user identification data to the on-token secure chip for verifying a user's identity, and to operably transmit a second user identification data to the on-card secure chip for verifying the user's identity; wherein if the user's identity is successfully confirmed by both the on-token secure chip and the on-card secure chip, the control circuit conducts a corresponding key backup operation or key restoration operation between the on-token secure chip and the on-card secure chip.

An example embodiment of a token device of a cryptography key backup system is disclosed, comprising: a transmission interface arranged to operably communicate data with a host device of the cryptography key backup system, and arranged to operably receive a host authentication data transmitted from the host device; a smart card accessing circuit arranged to operably access an on-card secure chip positioned on a smart card, wherein the on-card secure chip comprises a built-in on-card secure memory; an on-token secure chip comprising a built-in on-token secure memory; and a control circuit coupled with the transmission interface, the smart card accessing circuit, and the on-token secure chip, and arranged to operably generate one or more user identification data comprising the host authentication data, to operably transmit a first user identification data to the on-token secure chip for verifying a user's identity, and to operably transmit a second user identification data to the on-card secure chip for verifying the user's identity; wherein if the user's identity is successfully confirmed by both the on-token secure chip and the on-card secure chip, the control circuit conducts a corresponding key backup operation or key restoration operation between the on-token secure chip and the on-card secure chip according to instructions by the host device.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings.

The same reference numbers may be used throughout the drawings to refer to the same or like parts, components, or operations.

Figure 1:
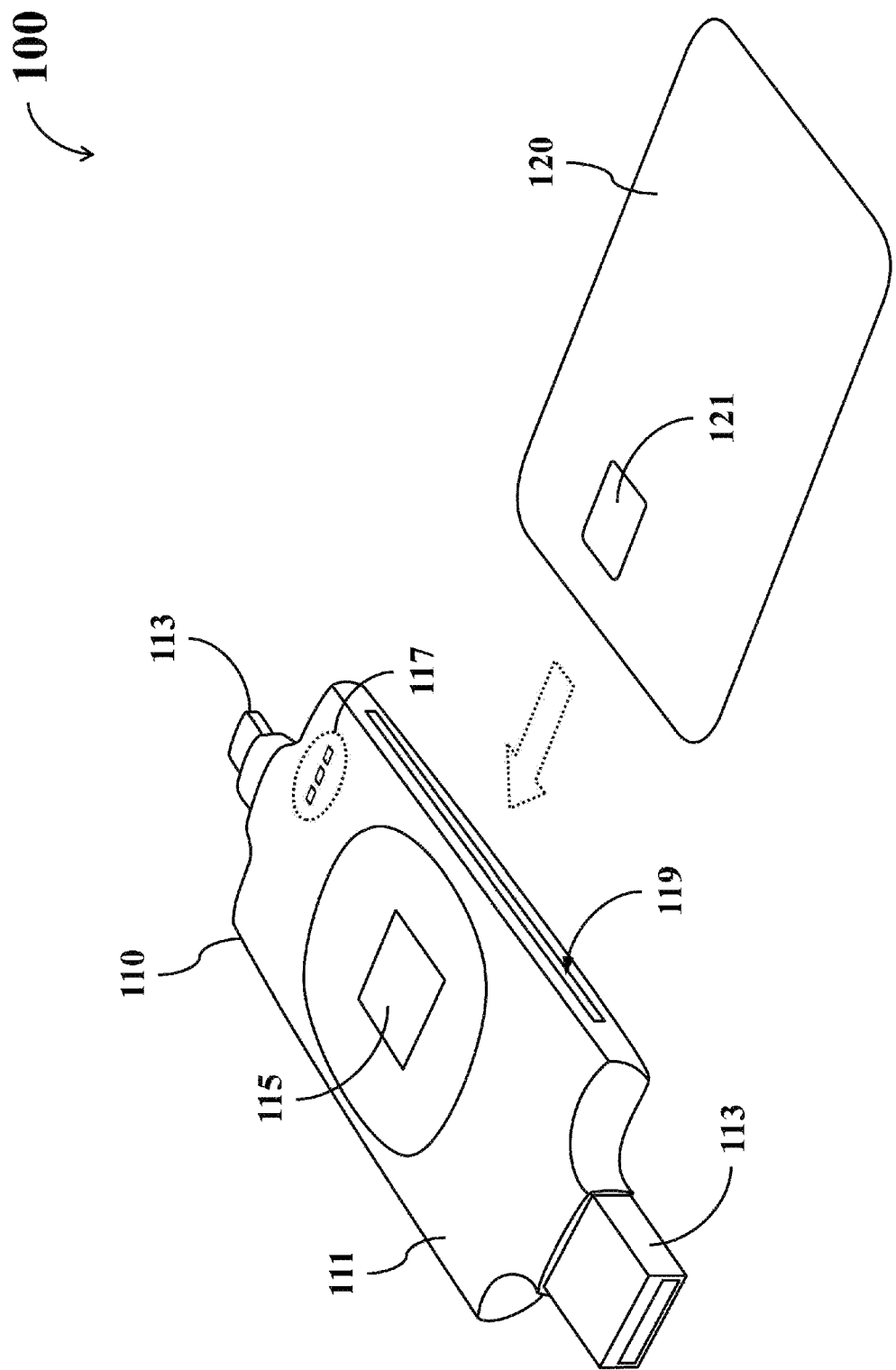
FIG. 1 shows a simplified schematic diagram of a cryptography key backup device according to one embodiment, of the present disclosure.
Figure 2:
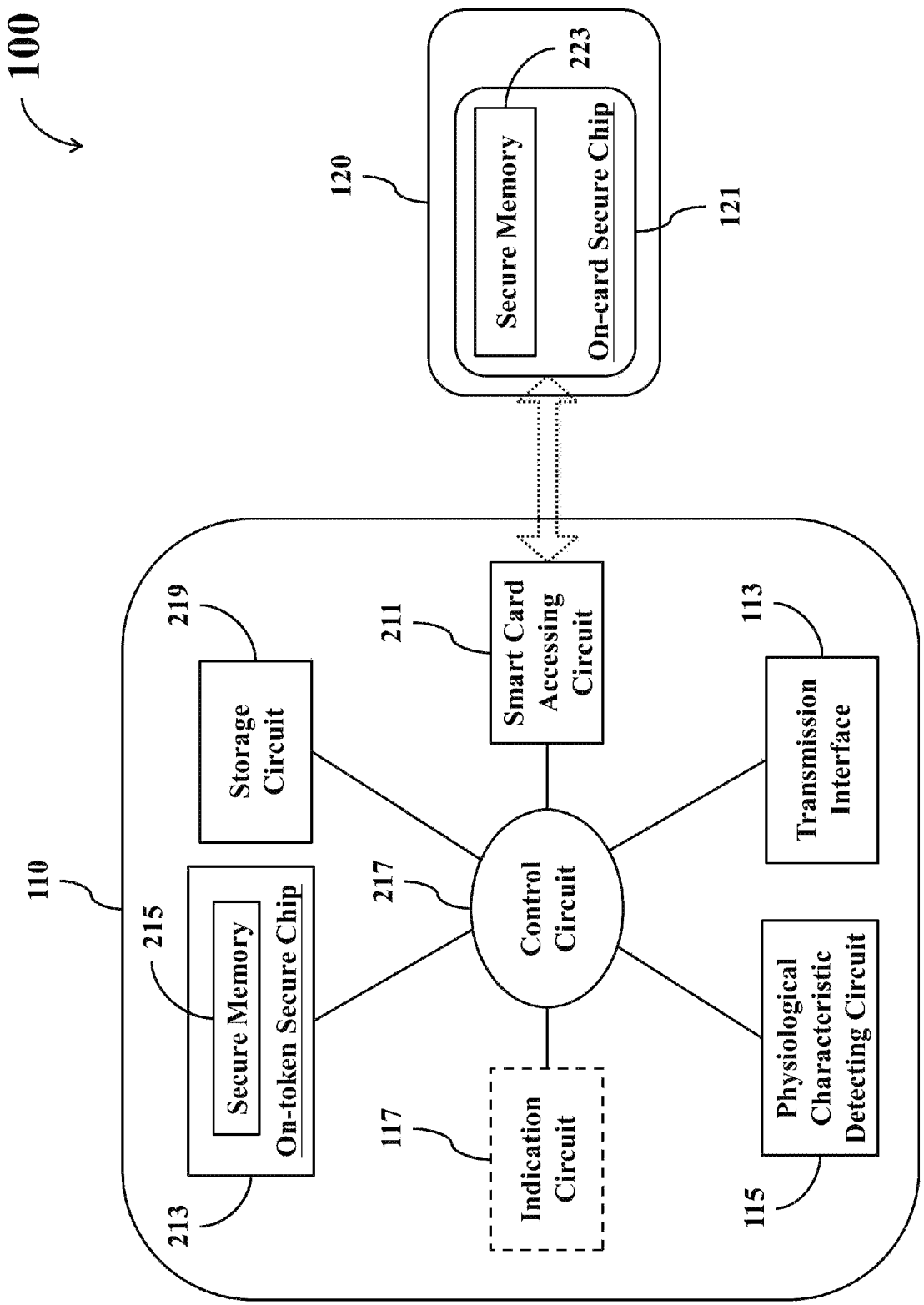
FIG. 2 shows a simplified functional block diagram of the cryptography key backup device in FIG. 1.

Please refer to FIG. 1 and FIG. 2. FIG. 1 shows a simplified schematic diagram of a cryptography key backup device 100 according to one embodiment of the present disclosure. FIG. 2 shows a simplified functional block diagram of the cryptography key backup device 100. The cryptography key backup device 100 comprises a token device 110 and one or more smart cards 120. The cryptography key backup device 100 is utilized for enabling a user to conduct cryptography key backup or restoration operation between the token device 110 and the smart cards 120.

The term "cryptography key" used throughout the description and the claims encompasses the digital signature keys, the digital encryption keys, and various cryptocurrencies (e.g., the Bitcoin, the Ether, the Ripple, the Litecoin, or the like) generated based on various cryptography algorithms.

In this embodiment, the token device 110 comprises a housing 111, a transmission interface 113, a physiological characteristic detecting circuit 115, an indication circuit 117, a card slot 119, a smart card accessing circuit 211, a secure chip 213, a secure memory 215, a control circuit 217, and a storage circuit 219. The secure memory 215 is built in the secure chip 213 and the access right of the secure memory 215 is controlled by the secure chip 213. On the other hand, the smart card 120 comprises a secure chip 121 and a secure memory 223. The secure memory 223 is built in the secure chip 121, and the access right of the secure memory 223 is controlled by the secure chip 121.

For illustrative purpose, the secure chip 213 is hereinafter referred to as the on-token secure chip 213; the secure memory 215 is hereinafter referred to as the on-token secure memory 215; the secure chip 121 is hereinafter referred to as the on-card secure chip 121; and the secure memory 223 is hereinafter referred to as the on-card secure memory 223.

One or more transmission interfaces 113 capable of receiving power required for operations of the token device 110 from an external device may be arranged in the token device 110. The aforementioned external device may be realized with various electronic devices capable of supplying electricity to the token device 110, such as a computer, a cell phone, a power bank, a charging cable, or the like. In addition, different transmission interface 113 may be realized with connectors of different specifications, so as to increase the types of external devices that can be connected to the token device 110.

For example, in the embodiment of FIG. 1, the token device 110 comprises two transmission interfaces 113 which are respectively protruded outward from the two ends of the housing 111. One of the transmission interfaces 113 may be designed to be compatible to a specific connector specification (e.g., the USB Type-A specification) while another transmission interface 113 may be designed to be compatible to another connector specification (e.g., the USB T e-C specification). When one of the transmission interfaces 113 is inserted into a corresponding power supply port of a suitable external device, the token device 110 can receive power required for the operations of the internal components from the external device through the transmission interface 113.

As a result, there is no need to place a power supply battery inside the housing 111 of the token device 110, and thus the whole volume and weight of the token device 110 can be effectively reduced.

In practice, the housing 111 of the token device 110 may be designed to have various shapes that are compact, portable, or easy to hold, rather than restricted to the embodiment of FIG. 1. For example, the token device 110 may be designed as various types of vehicle smart keys or home smart keys.

The physiological characteristic detecting circuit 115 is arranged to operably detect the action that a user touches or presses the physiological characteristic detecting circuit 115 (hereinafter, a user's touch action). In addition, the physiological characteristic detecting circuit 115 is further arranged to operably detect the user's physiological characteristics (a.k.a. biometric characteristics), such as, various skin textures (e.g., fingerprint or palm print), vein, electrocardiogram (ECG), or the like. As shown in FIG. 1, the sensing area of the physiological characteristic detecting circuit 115 exposes on the surface of the housing 111. When the user touches the sensing area of the physiological characteristic detecting circuit 115 with a particular part of his/her body (e.g., a finger, a toe, an elbow, an ear, or the like), the physiological characteristic detecting circuit 115 would detect the user's particular body part, so as to obtain the user's physiological characteristics.

The physiological characteristic detecting circuit 115 may be arranged to operably inform the control circuit 217 of that one user's touch action occurs at each time the physiological characteristic detecting circuit 115 is being touched. In practice, the physiological characteristic detecting circuit 115 may utilize various existing mechanical, optical, magnetic, or electrical detecting mechanisms to detect whether there occurs any user's touch action, and may utilize various existing physiological characteristic detecting mechanisms to detect the user's physiological characteristics.

For example, the physiological characteristic detecting circuit 115 may inform the control circuit 217 of that one user's touch action occurs at each time the sensing area is being touched by the user's particular body part. Before the user's particular body part leaves the sensing area, the control circuit 217 may not double count the occurrence times of the user's touch actions.

In addition, the physiological characteristic detecting circuit 115 may set appropriate filter conditions for the lasting time of that each time the physiological characteristic detecting circuit 115 is touched, so as to lower the probability of erroneously determining other situations as the user's touch actions. For example, the physiological characteristic detecting circuit 115 may be arranged to operably inform the control circuit 217 of that one user's touch action occurs at each time the physiological characteristic detecting circuit 115 is being touched only if the lasting time of the touch event is longer than a first predetermined time length (e.g., 0.1 second, 0.3 second, 1 second, or the like). On the contrary, if the lasting time of the touch event of the physiological characteristic detecting circuit 115 is shorter than the aforementioned first predetermined time length, then the physiological characteristic detecting circuit 115 may ignore the touch event and does not report to the control circuit 217.

The indication circuit 117 is arranged to operably generate indication messages for indicating the related operating progress of the token device 110, or to generate indication messages for guiding the user to change the smart card. The indication circuit 117 may be realized with various visual effects generation circuits capable of generating lights, displaying texts, displaying images, or displaying videos. The indication circuit 117 may be realized with various audio players capable of playing sounds or voices. The indication circuit 117 may be realized with various suitable circuits integrating the functions of generating visual effects and playing audio data.

The card slot 119 is arranged at one side of the housing 111, allowing the smart card 120 to insert therethrough, so that the on-card secure chip 121 on the smart card 120 can contact with the smart card accessing circuit 211.

The smart card accessing circuit 211 is arranged to operably detect the action that a user places the smart card 120 or other card to a position that can be detected by the smart card accessing circuit 211 (hereinafter, a user's card-placing action). In addition, the smart card accessing circuit 211 is further arranged to operably communicate commands or data with the on-card secure chip 121 when the smart card accessing circuit 211 contacts the on-card secure chip 121 on the smart The smart card accessing circuit 211 may inform the control circuit 217 of that one user's card-placing action occurs at each time the smart card accessing circuit 211 has detected that the smart card 120 or another card is placed or moved to the position which can be detected by the smart card accessing circuit 211. In practice, the smart card accessing circuit 211 may utilize various existing mechanical, optical, magnetic, or electrical detecting mechanisms to determine whether there occurs any user's card-placing action.

For example, in the embodiment of FIG. 1, the smart card accessing circuit 211 may inform the control circuit 217 of that one user's card-placing action occurs at each time the smart card accessing circuit 211 detects that the user inserts the smart card 120 or another card into the card slot 119. Before the user removes the smart card 120 or another card from the card slot 119, the control circuit 217 may not double count the occurrence times of the user's card-placing actions.

For another example, in some embodiments where the smart card accessing circuit 211 communicates with the smart card through a wireless inductive approach, the smart card accessing circuit 211 may inform the control circuit 217 of that one user's card-placing action occurs at each time the smart card accessing circuit 211 detects that the user moves the smart card 120 or another card to a place near the smart card accessing circuit 211. Before the user moves the smart card 120 or another card away from the sensing range of the smart card accessing circuit 211, the control circuit 217 may not double count the occurrence times of the user's card-placing actions.

In addition, the smart card accessing circuit 211 may set appropriate filter conditions for the lasting time of that each time the card stays in the position (or within an area) that can be detected by the smart card accessing circuit 211, so as to lower the probability of erroneously determining other situations as the user's card-placing actions.

For example, in the embodiment of FIG. 1, the smart card accessing circuit 211 may inform the control circuit 217 of that one user's card-placing action occurs at each time the user inserts the card into the card slot 119 only if the card stays in a detectable position for a period longer than a second predetermined time length (e.g., 0.1 second, 0.3 second, 1 second, or the like).

For another example, in some embodiments where the smart card accessing circuit 211 communicates with the smart card through a wireless inductive approach, the smart card accessing circuit 211 may inform the control circuit 217 of that one user's card-placing action occurs at each time the smart card accessing circuit 211 has detected that the user moves the smart card 120 or another card to a place near the smart card accessing circuit 211 only if the card stays within a On the contrary, if the card provided by the user at that time only stays in a position (or within a range) that can be detected by the smart card accessing circuit 211 for a period shorter than the aforementioned second predetermined time length, then the smart card accessing circuit 211 may ignore this card-placing action and may does not report to the control circuit 217.

The on-token secure memory 215 in the on-token secure chip 213 is prestored with identification data of the valid user of the cryptography key backup device 100 (hereinafter, the valid user identification data). On the other hand, the valid user identification data is also prestored in the on-card secure memory 223 of the on-card secure chip 121.

The aforementioned valid user identification data may be an identification data generated based on a valid user's unique biological characteristics. For example, the valid user identification data may be the potential difference records, entropy records, grayscale images, multilevel images, color images, or invisible special spectrum images corresponding to user's finger print or vein distribution. Alternatively, the valid user identification data may be digital data generated by conducting various existing characteristic algorithms on the above data.

In practice, the on-token secure memory 215 and the on-card secure memory 223 may store the same valid user identification data, or may store different user identification data of the same valid user. For example, in some embodiments, the valid user identification data stored in the on-token secure memory 215 corresponds to one of the physical characteristics (e.g., right index finger print) of the valid user while the valid user identification data stored in the on-card secure memory 223 corresponds to another biological characteristic (e.g., left index finger print) of the valid user.

As shown in FIG. 2, the control circuit 217 is coupled with the transmission interface 113, the physiological characteristic detecting circuit 115, the indication circuit 117, the smart card accessing circuit 211, and the on-token secure chip 213. The control circuit 217 is arranged to operably control the operations of the above elements, and further arranged to operably record the time points of occurrence and the occurrence times of the user's touch actions according to the notification from the physiological characteristic detecting circuit 115. In addition, the control circuit 217 is further arranged to operably record the time points of occurrence and the occurrence times of the user's card-placing actions according to the notification from the smart card accessing circuit 211.

For convenience of explanation, the aforementioned occurrence times of user's touch actions is hereinafter referred to as a touch count while the aforementioned occurrence times of user's card-placing actions is hereinafter referred to as a card-placing count.

In operations, the control circuit 217 may generate one or more user identification data corresponding to the detecting result of the physiological characteristic detecting circuit 115, and may also respectively transmit the related user identification data to the on-token secure chip 213 and the on-card secure chip 121 for verifying the user's identity. In this embodiment, the control circuit 217 determines the instructions from the user according to the user's manipulations on the cryptography key backup device 100 and then conducts a corresponding cryptography key backup operation or key restoration operation between the on-token secure chip 213 and the on-card secure chip 121 only if the user's identity is successfully confirmed by both the on-token secure chip 213 and the on-card secure chip 121.

The storage circuit 219 is coupled with the control circuit 217, and is arranged to operably store the program or data required for operations of the control circuit 217.

In practice, the control circuit 217 may be realized with various programmable processors having computing ability and capable of parsing commands. Each of the on-token secure chip 213 and the on-card secure chip 121 may be realized with various processors or controllers capable of conducting cryptographic algorithm operations, generating cryptography key and conducting operation on the cryptography key, conducting electronic signature algorithm operations, and capable of storing confidential data. For example, the on-token secure chip 213 may be realized with various secure micro-controllers, secure chips, hardware secure modules (HSM), or the like that are certified by international data security regulations, so as to ensure that the valid user identification data and related cryptography keys stored in the on-token secure memory 215 cannot be tampered easily. The on-card secure chip 121 may be realized with various smart card chips certified by international data security regulations, so as to ensure that the valid user identification data and related cryptography keys stored in the on-card secure memory 223 cannot be tampered easily.

Figure 3:
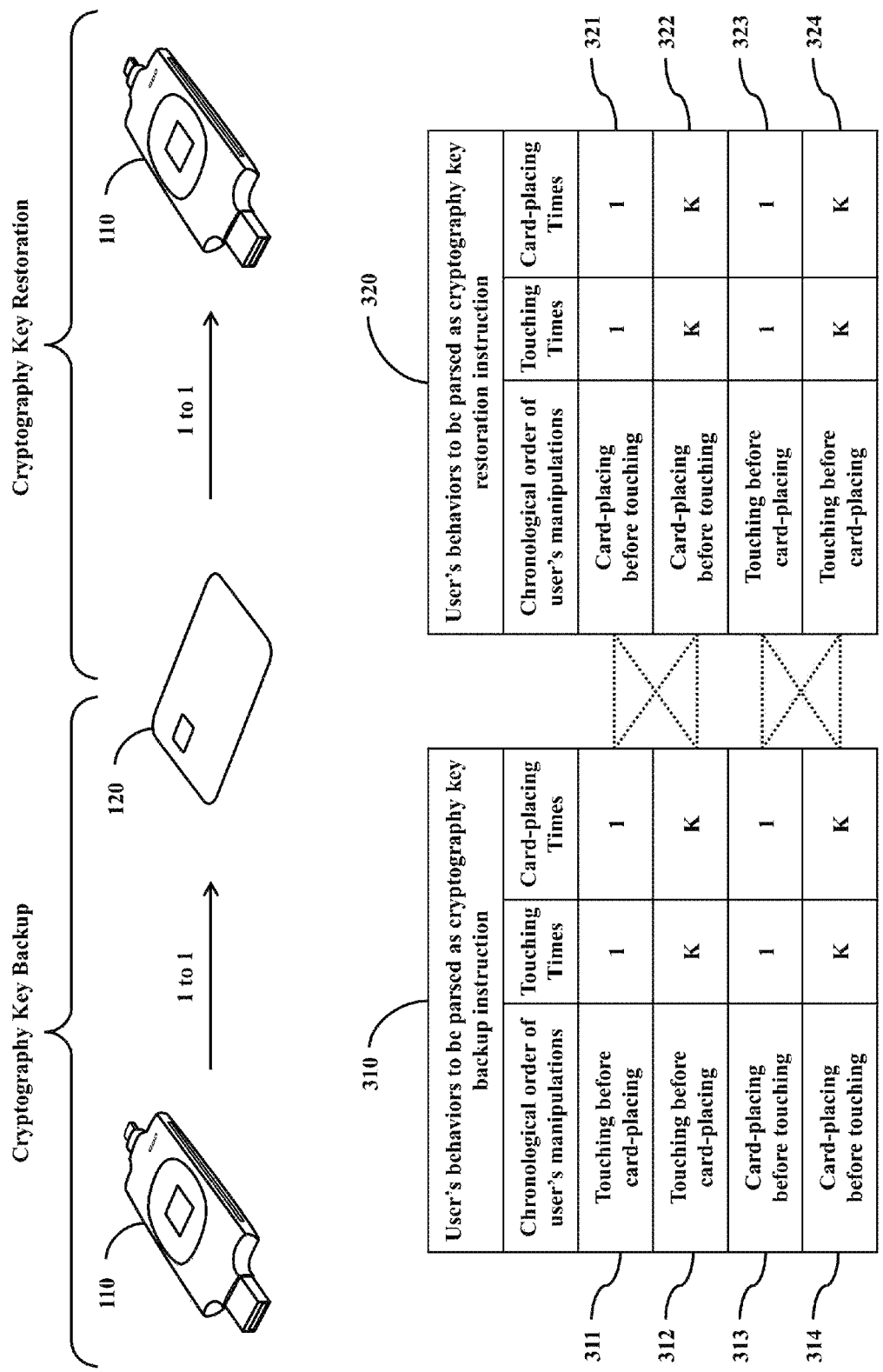
FIG. 3 shows a simplified schematic diagram of a first application scheme of the cryptography key backup device in FIG. 1.
Figure 4:
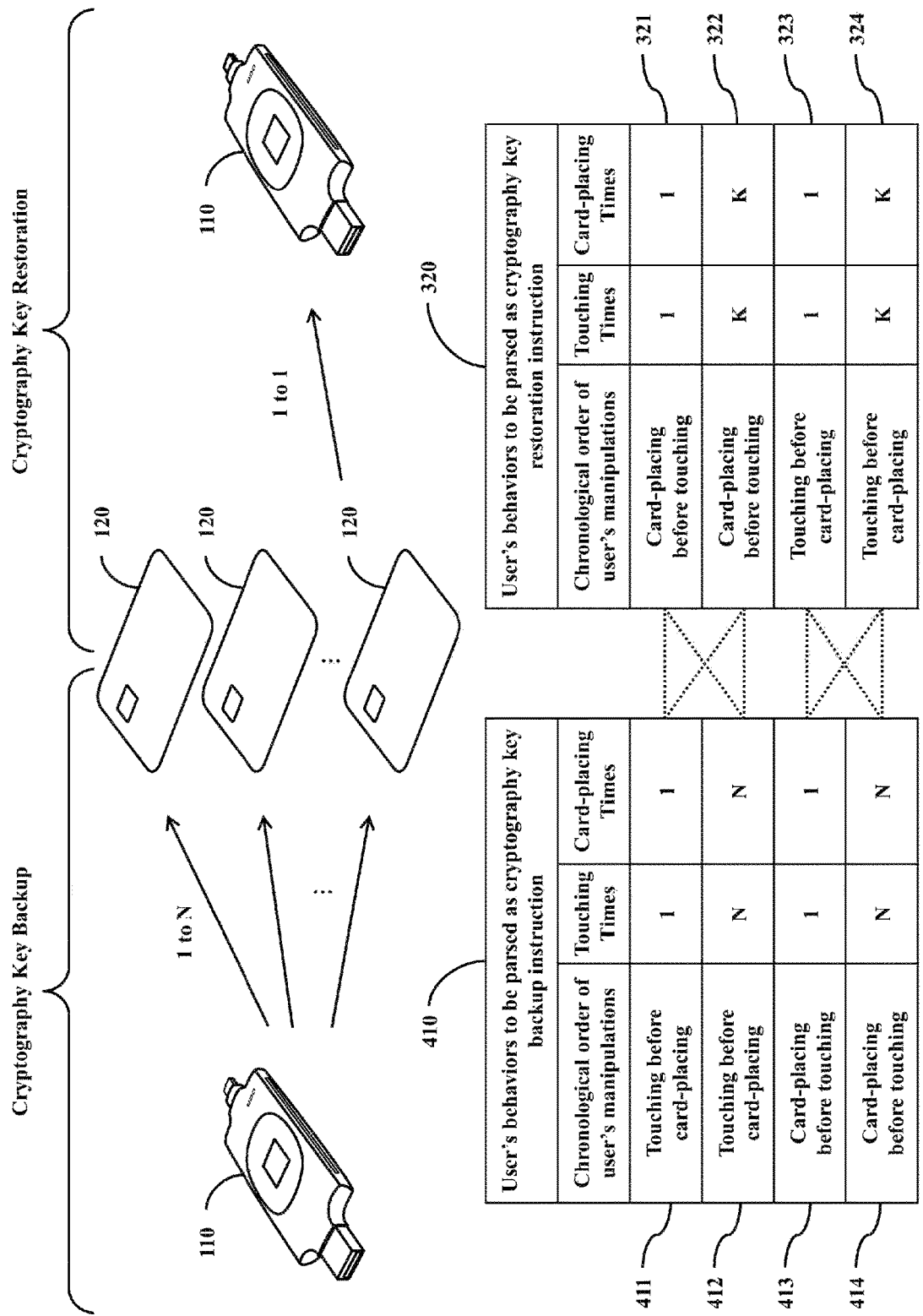
FIG. 4 shows a simplified schematic diagram of a second application scheme of the cryptography key backup device in FIG. 1.
Figure 5:
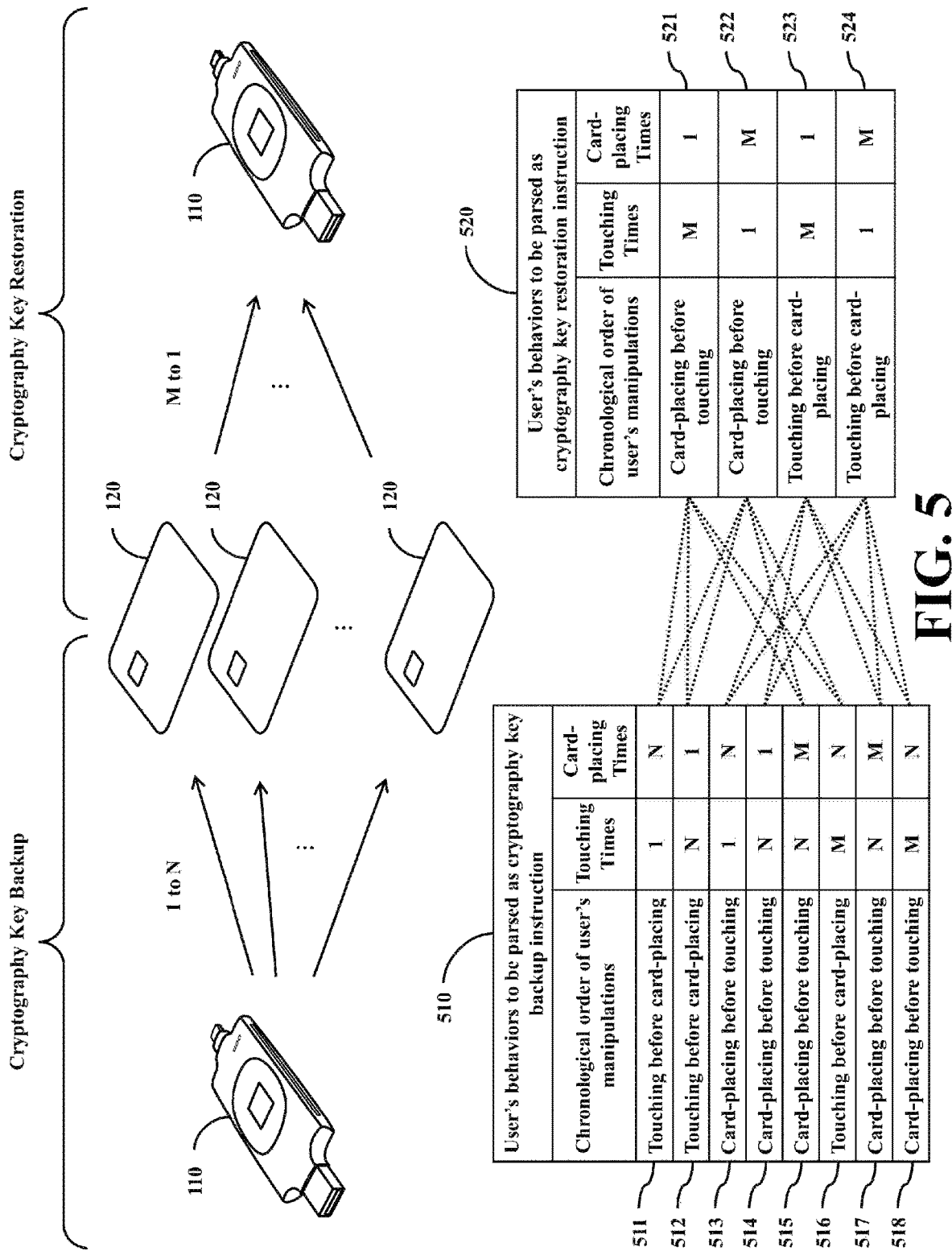
FIG. 5 shows a simplified schematic diagram of a third application scheme of the cryptography key backup device in FIG. 1.

A number of application schemes of the cryptography key backup device 100 will be described below with reference to FIG. 3 through FIG. 5. FIG. 3 shows a simplified schematic diagram of a first application scheme of the cryptography key backup device 100. FIG. 4 shows a simplified schematic diagram of a second application scheme of the cryptography key backup device 100. FIG. 5 shows a simplified schematic diagram of a third application scheme of the cryptography key backup device 100.

In the application scheme shown in FIG. 3, the user may issue a cryptography key backup instruction to the token device 110 according to the manipulation guidance described in the user behavior table 310, so that the token device 110 copies a target key stored in the on-token secure memory 215 to the on-card secure memory 223 of a single smart card 120 for storing by utilizing a simple one-to-one backup approach. As a result, the target key that was only stored in the token device 110 thereby has a backup version stored in the smart card 120.

For example, in one embodiment, the user may follow the guidance of the user behavior pattern 311 to first conduct the user's touch action one time, and then conduct the user's card-placing action one time, so as to issue a cryptography key backup instruction to the token device 110.

In another embodiment, the user may follow the guidance of the user behavior pattern 312 to first conduct the user's touch action K times, and then conduct the user's card-placing action K times, so as to issue a cryptography key backup instruction to the token device 110, wherein K is a positive integer greater than 1.

In yet another embodiment, the user may follow the guidance of the user behavior pattern 313 to first conduct the user's card-placing action one time, and then conduct the user's touch action one time, so as to issue a cryptography key backup instruction to the token device 110.

In yet another embodiment, the user may follow the guidance of the user behavior pattern 314 to first conduct the user's card-placing action K times, and then conduct the user's touch action K times, so as to issue a cryptography key backup instruction to the token device 110.

After the aforementioned cryptography key backup operation is completed, the target key stored in the token device 110 would have a backup version stored in a single smart card 120.

Thereafter, when the user wants to restore the target key stored in the smart card 120 to a certain token device 110, the user may manipulate the token device 110 according to the manipulation guidance described in the user behavior table 320 shown in FIG. 3, so as to issue a cryptography key restoration instruction to the token device 110. In response to the cryptography key restoration instruction, the token device 110 would copy the target key stored in a single smart card 120 to the on-token secure memory 215 of a single token device 110 for storing by utilizing a simple one-to-one restoration approach. As a result, the target key stored in the smart card 120 can be restored to the token device 110.

For example, in one embodiment, the user may follow the guidance of the user behavior pattern 321 to first conduct the user's card-placing action one time, and then conduct the user's touch action one time, so as to issue a cryptography key restoration instruction to the token device 110.

In another embodiment, the user may follow the guidance of the user behavior pattern 322 to first conduct the user's card-placing action K times, and then conduct the user's touch action K times, so as to issue a cryptography key restoration instruction to the token device 110, wherein K is a positive integer greater than 1.

In yet another embodiment, the user may follow the guidance of the user behavior pattern 323 to first conduct the user's touch action one time, and then conduct the user's card-placing action one time, so as to issue a cryptography key restoration instruction to the token device 110.

In yet another embodiment, the user may follow the guidance of the user behavior pattern 324 to first conduct the user's touch action K times, and then conduct the user's card-placing action K times, so as to issue a cryptography key restoration instruction to the token device 110.

After the aforementioned cryptography key restoration operation is completed, the target key stored in a single smart card 120 is restored to a single token device 110.

In practical applications, the user's manipulation behavior for issuing a cryptography key backup instruction cannot be identical to the user's manipulation behavior for issuing a cryptography key restoration instruction (that is, the two kinds of user's manipulation behaviors should be distinguishable from each other), so as to avoid conflict when the token device 110 interprets the user's instructions.

In FIG. 3, each dotted line between the user behavior tables 310 and 320 indicates a feasible combination of the user's behavior for issuing the cryptography key backup instruction and the user's behavior for issuing the cryptography key restoration instruction.

For example, the user's behavior for issuing a cryptography key backup instruction as described in the user behavior pattern 311 or 312 can be paired with the user's behavior for issuing a cryptography key restoration instruction as described in the user behavior pattern 321 or 322.

For another example, the user's behavior for issuing a cryptography key backup instruction as described in the user behavior pattern 313 or 314 can be paired with the user's behavior for issuing a cryptography key restoration instruction as described in the user behavior pattern 323 or 324.

In the application scheme shown in FIG. 4, the user may issue a cryptography key backup instruction to the token device 110 according to the manipulation guidance described in the user behavior table 410, so that the token device 110 copies a target key stored in the on-token secure memory 215 to the on-card secure memories 223 of multiple smart cards 120 for storing by utilizing a simple one-to-many backup approach. As a result, the target key that was only stored in the token device 110 thereby has multiple identical backup versions respectively stored in multiple different smart cards 120.

For example, in one embodiment, the user may follow the guidance of the user behavior pattern 411 to first conduct the user's touch action one time, and then conduct the user's card-placing action N times, so as to issue a cryptography key backup instruction to the token device 110, wherein N is a positive integer greater than 1 and represents the number of the smart cards to be used for backing up the target key. For example, the user may first conduct the user's touch action one time, and then conduct the user's card-placing action 2 times, so as to instruct the token device 110 to back up the target key into two smart cards 120. For another example, the user may first conduct the user's touch action one time, and then conduct the user's card-placing action 3 times, so as to instruct the token device 110 to back up the target key into three smart cards 120.

In another embodiment, the user may follow the guidance of the user behavior pattern 412 to first conduct the user's touch action N times, and then conduct the user's card-placing action one time, so as to issue a cryptography key backup instruction to the token device 110, wherein N is a positive integer greater than 1 and represents the number of the smart cards to be used for backing up the target key. For example, the user may first conduct the user's touch action 2 times, and then conduct the user's card-placing action one time, so as to instruct the token device 110 to back up the target key into two smart cards 120. For another example, the user may first conduct the user's touch action 3 times, and then conduct the user's card-placing action one time, so as to instruct the token device 110 to back up the target key into three smart cards 120.

In yet another embodiment, the user may follow the guidance of the user behavior pattern 413 to first conduct the user's card-placing action one time, and then conduct the user's touch action N times, so as to issue a cryptography key backup instruction to the token device 110, wherein N is a positive integer greater than 1 and represents the number of the smart cards to be used for backing up the target key.

In yet another embodiment, the user may follow the guidance of the user behavior pattern 414 to first conduct the user's card-placing action N times, and then conduct the user's touch action one time, so as to issue a cryptography key backup instruction to the token device 110, wherein N is a positive integer greater than 1 and represents the number of the smart cards to be used for backing up the target key.

During the cryptography key backup operation, the user may change the smart card accessed by the token device 110 one after another according to a predetermined time interval or indication messages from the token device 110, so that the token device 110 can successively write the target key to multiple smart cards 120.

After the aforementioned cryptography key backup operation is completed, the target key stored in the token device 110 thereby has multiple identical backup versions respectively stored in multiple different smart cards 120. That is, the target keys stored in the aforementioned multiple smart cards 120 are all the same.

Thereafter, when the user wants to restore the target key stored in the smart card 120 to a certain token device 110, the user may manipulate the token device 110 according to the manipulation guidance described in the user behavior table 320 shown in FIG. 4, so as to issue a cryptography key restoration instruction to the token device 110. In response to the cryptography key restoration instruction, the token device 110 would copy the target key stored in a single smart card 120 to the on-token secure memory 215 of a single token device 110 for storing by utilizing a simple one-to-one restoration approach. As a result, the target key stored in the smart card 120 can be restored to the token device 110.

The user behavior table 320 shown in FIG. 4 is the same as the aforementioned user behavior table 320 shown in FIG. 3, so the aforementioned descriptions regarding the user behavior table 320 shown in FIG. 3 are also applicable to the application scheme of FIG. 4. For the sake of brevity, the descriptions of the user's related manipulation will not be repeated here.

After the aforementioned cryptography key restoration operation is completed, the target key stored in a single smart card 120 is restored to a single token device 110.

In FIG. 4, each dotted line between the user behavior tables 410 and 320 indicates a feasible combination of the user's behavior for issuing the cryptography key backup instruction and the user's behavior for issuing the cryptography key restoration instruction.

For example, the user's behavior for issuing a cryptography key backup instruction as described in the user behavior pattern 411 or 412 can be paired with the user's behavior for issuing a cryptography key restoration instruction as described in the user behavior pattern 321 or 322.

For another example, the user's behavior for issuing a cryptography key backup instruction as described in the user behavior pattern 413 or 414 can be paired with the user's behavior for issuing a cryptography key restoration instruction as described in the user behavior pattern 323 or 324.

In the application scheme shown in FIG. 5, the user may issue a cryptography key backup instruction to the token device 110 according to the manipulation guidance described in the user behavior table 510, so that the token device 110 backs up a target key stored in the on-token secure memory 215 to multiple on-card secure memories 223 of multiple smart cards 120 by utilizing a M-of-N backup approach. As a result, the target key that was only stored in the token device 110 is split into multiple key data segments and respectively stored in multiple smart cards 120 by utilizing the M-of-N backup approach. In this situation, the target key can be restored based on the key data segments stored in a predetermined number of smart cards 120 in the future.

For example, in one embodiment, the user may follow the guidance of the user behavior pattern 511 to first conduct the user's touch action one time, and then conduct the user's card-placing action N times, so as to issue a cryptography key backup instruction to the token device 110, wherein N is a positive integer greater than 1 and represents the number of the smart cards to be used for backing up the target key. For example, the user may first conduct the user's touch action one time, and then conduct the user's card-placing action 3 times, so as to instruct the token device 110 to back up the target key into three smart cards 120. For another example, the user may first conduct the user's touch action one time, and then conduct the user's card-placing action In another embodiment, the user may follow the guidance of the user behavior pattern 512 to first conduct the user's touch action N times, and then conduct the user's card-placing action one time, so as to issue a cryptography key backup instruction to the token device 110, wherein N is a positive integer greater than 1 and represents the number of the smart cards to be used for backing up the target key. For example, the user may first conduct the user's touch action 3 times, and then conduct the user's card-placing action one time, so as to instruct the token device 110 to back up the target key into three smart cards 120. For another example, the user may first conduct the user's touch action 5 times, and then conduct the user's card-placing action one time, so as to instruct the token device 110 to back up the target key into five smart cards 120.

In yet another embodiment, the user may follow the guidance of the user behavior pattern 513 to first conduct the user's card-placing action one time, and then conduct the user's touch action N times, so as to issue a cryptography key backup instruction to the token device 110, wherein N is a positive integer greater than 1 and represents the number of the smart cards to be used for backing up the target key.

In yet another embodiment, the user may follow the guidance of the user behavior pattern 514 to first conduct the user's card-placing action N times, and then conduct the user's touch actions one time, so as to issue a cryptography key backup instruction to the token device 110, wherein N is a positive integer greater than 1 and represents the number of the smart cards to be used for backing up the target key.

In addition, in some application schemes shown in FIG. 5, the user may also manipulate the touching times or the card-placing times to configure the number of the smart cards required for restoring the target key in the future.

For example, in one embodiment, the user may follow the guidance of the user behavior pattern 515 to first conduct the user's touch action N times, and then conduct the user's card-placing action M times, so as to issue a cryptography key backup instruction to the token device 110, wherein N is a positive integer greater than 1 and represents the number of the smart cards to be used for backing up the target key, while M is a positive integer greater than 1 and less than N, and represents the number of the smart cards required for restoring the target key in the future. For example, the user may first conduct the user's touch action 3 times, and then conduct the user's card-placing action 2 times, so as to instruct the token device 110 to back up the target key into three smart cards 120, and to inform the token device 110 of that the target key can be restored by utilizing the data stored in any two smart cards out of the above three smart cards 120. For another example, the user may first conduct the user's touch action 5 times, and then conduct the user's card-placing action 3 times, so as to instruct the token device 110 to back up the target key into five smart cards 120, and to inform the token device 110 of that the target key can be restored by utilizing the data stored in any three smart cards out of the above five smart cards 120.

In another embodiment, the user may follow the guidance of the user behavior pattern 516 to first conduct the user's touch action M times, and then conduct the user's card-placing action N times, so as to issue a cryptography key backup instruction to the token device 110, wherein N is a positive integer greater than 1 and represents the number of the smart cards to be used for backing up the target key, while M is a positive integer greater than 1 and less than N, and represents the number of the smart cards required for restoring the target key in the future. For example, the user may first conduct the user's touch action 2 times, and then conduct the user's card-placing action 3 times, so as to instruct the token device 110 to back up the target key into three smart cards 120, and to inform the token device 110 of that the target key can be restored by utilizing the data stored in any two smart cards out of the above three smart cards 120. For another example, the user may first conduct the user's touch action 3 times, and then conduct the user's card-placing action 5 times, so as to instruct the token device 110 to back up the target key into five smart cards 120, and to inform the token device 110 of that the target key can be restored by utilizing the data of any three smart cards out of the above five smart cards 120.

In yet another embodiment, the user may follow the guidance of the user behavior pattern 517 to first conduct the user's card-placing action N times, and then conduct the user's touch action M times, so as to issue a cryptography key backup instruction to the token device 110, wherein N is a positive integer greater than 1 and represents the number of the smart cards to be used for backing up the target key, while M is a positive integer greater than 1 and less than N, and represents the number of the smart cards required for restoring the target key in the future.

In yet another embodiment, the user may follow the guidance of the user behavior pattern 518 to first conduct the user's card-placing action M times, and then conduct the user's touch action N times, so as to issue a cryptography key backup instruction to the token device 110, wherein N is a positive integer greater than 1 and represents the number of the smart cards to be used for backing up the target key, while M is a positive integer greater than 1 and less than N, and represents the number of the smart cards required for restoring the target key in the future.

During the cryptography key backup operation, the user may change the smart card accessed by the token device 110 one after another according to a predetermined time interval or indication messages from the token device 110, so that the token device 110 can respectively write the key data segments of the target key to multiple smart cards 120.

After the aforementioned cryptography key backup operation is completed, the target key stored in the token device 110 thereby has multiple key data segments respectively stored in multiple smart cards 120, and the target key can only be restored by combining the key data segments stored in two or more smart cards out of the multiple smart cards 120 together in the future.

Thereafter, when the user wants to restore the target key stored in the multiple smart cards 120 to a certain token device 110, the user may manipulate the token device 110 according to the manipulation guidance described in the user behavior table 520 shown in FIG. 5, so as to issue a cryptography key restoration instruction to the token device 110. In response to the cryptography key restoration instruction, the token device 110 would combine multiple key data segments respectively stored in a predetermined number of smart cards 120 by utilizing a many-to-one restoration approach, so as to restore the target key and copy the target key to the on-token secure memory 215 of a single token device 110 for storing. As a result, the target key stored in those smart cards 120 can be restored to the token device 110.

For example, in one embodiment, the user may follow the guidance of the user behavior pattern 521 to first conduct the user's card-placing action M times, and then conduct the user's touch action one time, so as to issue a cryptography key restoration instruction to the token device 110, wherein M is a positive integer greater than 1, and represents the number of the smart cards required for restoring the target key. For example, the user may first conduct the user's card-placing action 2 times, and then conduct the user's touch action one time, so as to instruct the token device 110 to combine the data stored in two smart cards 120 to be successively provided by the user to restore the target key. For another example, the user may first conduct the user's card-placing action 3 times, and then conduct the user's touch action one time, so as to instruct the token device 110 to combine the data stored in three smart cards 120 to be successively provided by the user to restore the target key.

In another embodiment, the user may follow the guidance of the user behavior pattern 522 to first conduct the user's card-placing action one time, and then conduct the user's touch action M times, so as to issue a cryptography key restoration instruction to the token device 110, wherein M is a positive integer greater than 1, and represents the number of the smart cards required for restoring the target key. For example, the user may first conduct the user's card-placing action one time, and then conduct the user's touch action 2 times, so as to instruct the token device 110 to combine the data stored in two smart cards 120 to be successively provided by the user to restore the target key. For another example, the user may first conduct the user's card-placing action one time, and then conduct the user's touch action 3 times, so as to instruct the token device 110 to combine the data stored in three smart cards 120 to be successively provided by the user to restore the target key.

In yet another embodiment, the user may follow the guidance of the user behavior pattern 523 to first conduct the user's touch action M times, and then conduct the user's card-placing action one time, so as to issue a cryptography key restoration instruction to the token device 110, wherein M is a positive integer greater than 1, and represents the number of the smart cards required for restoring the target key.

In yet another embodiment, the user may follow the guidance of the user behavior pattern 524 to first instruct the user's touch action one time, and then conduct the user's card-placing action M times, so as to issue a cryptography key restoration instruction to the token device 110, wherein M is a positive integer greater than 1, and represents the number of the smart cards required for restoring the target key.

During the cryptography key restoration operation, the user may successively change the smart card accessed by the token device 110 one after another according to a predetermined time interval or indication messages from the token device 110, so that the token device 110 can read the key data segments stored in multiple smart cards 120 to restore the target key.

After the aforementioned cryptography key restoration operation is completed, multiple key data segments respectively stored in multiple smart cards 120 can be restored to the target key and be stored in a single token device 110.

In FIG. 5, each dotted line between the user behavior tables 510 and 520 indicates a feasible combination of the user's behavior for issuing the cryptography key backup instruction and the user's behavior for issuing the cryptography key restoration instruction.

For example, the user's behavior for issuing a cryptography key backup instruction described in the user behavior pattern 511, 512, 515 or 516 can be paired with the user's behavior for issuing a cryptography key restoration instruction described in the user behavior pattern 521 or 522.

For another example, the user's behavior for issuing a cryptography key backup instruction described in the user behavior pattern 513, 514, 517 or 518 can be paired with the user's behavior for issuing a cryptography key restoration instruction described in the user behavior pattern 523 or 524.

Please note that in the aforementioned application schemes shown in FIG. 3 through FIG. 5, the token device 110 utilized during the cryptography key backup operation and the token device 110 utilized during the cryptography key restoration operation may be the same token device, or may be different token devices.

As can be appreciated from the foregoing descriptions, the user may issue related manipulating instructions to the token device 110 through the aforementioned behaviors, so as to instruct the token device 110 to conduct a corresponding key backup operation or key restoration operation.

On the other hand, the token device 110 may identify the instruction issued by the user according to the user's manipulation to the token device 110. In practice, the token device 110 may determine the operation type instructed by the user according to the chronological order of the user's touch action and the user's card-placing action.

For example, in some embodiments, the token device 110 may interpret the user's behaviors where the user's touch action takes place before the user's card-placing action as that the user instructs the token device 110 to conduct a key backup operation, and may interpret the user's behaviors where the user's card-placing action takes place before the user's touch action as that the user instructs the token device 110 to conduct a key restoration operation.

Alternatively, in some embodiments, the token device 110 may interpret the user's behaviors where the user's card-placing action takes place before the user's touch action as that the user instructs the token device 110 to conduct a key backup operation, and may interpret the user's behaviors where the user's touch action takes place before the user's card-placing action as that the user instructs the token device 110 to conduct a key restoration operation.

In some embodiments, the token device 110 may further determine the related operation parameters configured by the user, for example, the cryptography key backup schemes, the cryptography key restoration schemes, the total number of smart cards required during the cryptography key backup or restoration operation, or the like, according to the touching times (i.e., the aforementioned occurrence times of the user's touch actions) and the card-placing times (i.e., the aforementioned occurrence times of the user's card-placing actions).

Figure 6:
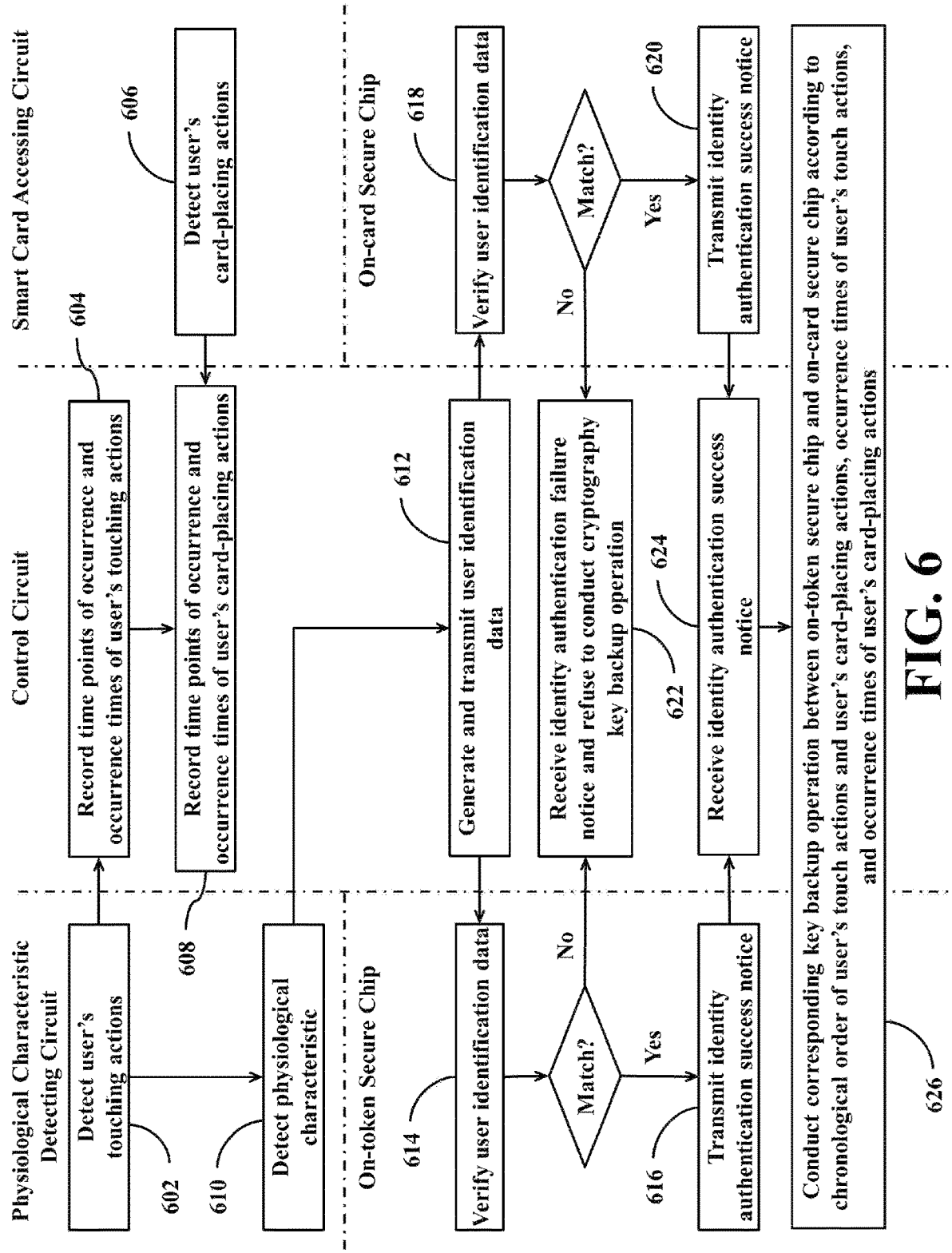
FIG. 6 shows a simplified flowchart of a cryptography key backup method according, to one embodiment of the present disclosure.

The method for utilizing the cryptography key backup device 100 to conduct a cryptography key backup operation will be further described below with reference to FIG. 6. FIG. 6 shows a simplified flowchart of a cryptography key backup method according to one embodiment of the present disclosure.

In the flowchart of FIG. 6, operations within a column under the name of a specific device are operations to be performed by the specific device. For example, operations within a column under the label "Physiological Characteristic Detecting Circuit" are operations to be performed by the physiological characteristic detecting circuit 115; operations within a column under the label "On-Token Secure Chip" are operations to be performed by the on-token secure chip 213; operations within a column under the label "control circuit" are operations to be performed by the control circuit 217; and so forth. The same analogous arrangement also applies to the subsequent flowcharts.

In the embodiment of FIG. 6, the token device 110 allows the user to issue related cryptography key backup instructions to the token device 110 by conducting the aforementioned behaviors, so as to instruct the token device 110 to back up the target key stored in the on-token secure memory 215 into one or more smart cards 120 by utilizing a corresponding backup scheme.

While the user conducts the aforementioned manipulations on the cryptography key backup device 100, the token device 110 performs the operations 602, 604, 606, and 608 to recognize the user's manipulations on the cryptography key backup device 100.

In the operation 602, the physiological characteristic detecting circuit 115 detects the user's touch action and reports to the control circuit 217.

In the operation 604, the control circuit 217 records the time point of occurrence of each user's touch action and counts the occurrence times of the user's touch actions according to the notification from the physiological characteristic detecting circuit 115.

Since the user may repeatedly touch the physiological characteristic detecting circuit 115 two or more times, the physiological characteristic detecting circuit 115 and the control circuit 217 may repeat the above operations 602 and 604.

In one embodiment, the control circuit 217 may record the occurrence times of the user's touch actions informed by the physiological characteristic detecting circuit 115 as the touching times. For example, if the physiological characteristic detecting circuit 115 successively reports the occurrence of the user's touch action two times to the control circuit 217, then the control circuit 217 may record the touching times as two.

In some embodiments, the control circuit 217 may only count the occurrence times of the user's touch actions taking place within a reasonable period into the touching times, so as to lower the possibility of erroneously determining other events as user's touch actions. For example, the control circuit 217 may only count the first user's touch action and the subsequent user's touch actions that are detected within a first predetermined period (i.e., 3 seconds, 5 seconds, 10 seconds, or 30 seconds, etc.) after the first user's touch action into the touching times, but does not count the user's touch actions that are detected after the first predetermined period into the touching times.

For example, it is assumed that the aforementioned first predetermined period is 10 seconds. If the physiological characteristic detecting circuit 115 successively reports the occurrence of the user's touch action two times to the control circuit 217 within 10 seconds after the first user's touch action has been detected, and reports the occurrence of the user's touch action one more time to the control circuit 217 after 10 seconds since the first user's touch action has been detected, then the control circuit 217 may only count the first user's touch action and the subsequent two user's touch actions that are detected within 10 seconds after the first user's touch action into the touching times, and simply ignore the user's touch action that is detected after 10 seconds since the first user's touch action takes place. In this situation, the control circuit 217 of this embodiment may record the touching times to be three, rather than four.

In the operation 606, the smart card accessing circuit 211 detects the user's card-placing action and reports to the control circuit 217.

In the operation 608, the control circuit 217 records the time point of occurrence of each user's card-placing action and counts the occurrence times of the user's card-placing actions according to the notification from the smart card accessing circuit 211.

Since the user may repeatedly place the smart card 120 or other cards at a position (or within an area) that can be detected by the smart card accessing circuit 211 two or more times, the smart card accessing circuit 211 and the control circuit 217 may repeat the above operations 606 and 608.

In one embodiment, the control circuit 217 may record the occurrence times of the user's card-placing actions informed by the smart card accessing circuit 211 as the card-placing times. For example, if the smart card accessing circuit 211 successively reports the occurrence of the user's card-placing action two times to the control circuit 217, then the control circuit 217 may record the card-placing times as two.

In some embodiments, the control circuit 217 may only count the occurrence times of the user's card-placing actions taking place within a reasonable period into the card-placing times, so as to lower the possibility of erroneously determining other events as user's card-placing actions. For example, the control circuit 217 may only count the first user's card-placing action and the subsequent user's card-placing actions that are detected within a second predetermined period (i.e., 3 seconds, 5 seconds, 10 seconds, or 30 seconds, etc.) after the first user's card-placing action into the card-placing times, but does not count the user's card-placing actions that are detected after the second predetermined period into the card-placing times.

For example, it is assumed that the aforementioned second predetermined period is 20 seconds. If the smart card accessing circuit 211 successively reports the occurrence of the user's card-placing action three times to the control circuit 217 within 20 seconds after the first user's card-placing action has been detected, and reports the occurrence of the user's card-placing action one more time to the control circuit 217 after 20 seconds since the first user's card-placing action has been detected, then the control circuit 217 may only count the first user's card-placing action and the subsequent three user's card-placing actions that are detected within 20 seconds after the first user's card-placing action into the card-placing times, and simply ignore the user's card-placing action that is detected after 20 seconds since the first user's card-placing action takes place. In this situation, the control circuit 217 of this embodiment may record the card-placing times to be four, rather than five.

In practical applications, the user may first conduct the user's touch action and then conduct the user's card-placing action, or may first conduct user's card-placing action and then conduct the user's touch action. Therefore, the operations 606 and 608 may be performed after the operations 602 and 604, or before the operations 602 and 604.

On the other hand, the token device 110 also cooperates with the smart card 120 to perform the operations 610 through 620 to conduct the user identity authentication procedure, so as to verify the reality and validity of the user.

In the operation 610, the physiological characteristic detecting circuit 115 detects the user's physiological characteristics and transmits the detecting result to the control circuit 217. In practice, the physiological characteristic detecting circuit 115 may simultaneously perform the operation 610 during the aforementioned operation 602.

Alternatively, the control circuit 217 may control the indication circuit 117 to send related indication messages at a specific time, so as to indicate the user to touch the sensing area of the physiological characteristic detecting circuit 115 so that the physiological characteristic detecting circuit 115 can scan his/her fingerprint.

In the operation 612, the control circuit 217 generates corresponding user identification data according to the detecting result of the physiological characteristic detecting circuit 115, and respectively transmits the user identification data to the on-token secure chip 213 and the on-card secure chip 121 to verify.

In the embodiment of that the valid user identification data prestored in the on-token secure memory 215 and the on-card secure memory 223 are identical, the control circuit 217 may transmit the same user identification data to the on-token secure chip 213 and the on-card secure chip 121 for verifying the user's identity.

In the embodiments where the valid user identification data stored in the on-token secure memory 215 and the on-card secure memory 223 are different, the user identification data transmitted to the on-token secure chip 213 by the control circuit 217 may be different from the user identification data transmitted to the on-card secure chip 121 by the control circuit 217.

For example, the user may follow a prearranged order or the indication messages from the indication circuit 117 to provide different fingerprints (i.e., right index finger print and left index finger print) to the physiological characteristic detecting circuit 115 one after another for scanning. In this situation, the control circuit 217 may generate two different user identification data one after another. The control circuit 217 may transmit one of the user identification data to the on-token secure chip 213 for verifying the user's identity, and transmit another user identification data to the on-card secure chip 121 for verifying the user's identity.

In the operation 614, the on-token secure chip 213 verifies the user identification data transmitted from the control circuit 217 to conduct a token-side user identity authentication procedure. The on-token secure chip 213 may utilize various existing verification methods to compare the user identification data transmitted from the control circuit 217 with the valid user identification data prestored in the on-token secure memory 215.

The user identification data transmitted from the control circuit 217 can pass the user identity authentication procedure conducted by the on-token secure chip 213 only if it matches the valid user identification data prestored in the on-token secure memory 215.

If the on-token secure chip 213 determines that the user identification data transmitted from the control circuit 217 matches the valid user identification data prestored in the on-token secure memory 215, then the on-token secure chip 213 performs the operation 616; otherwise, the on-token secure chip 213 transmits an identity authentication failure notice to the control circuit 217.

In the operation 616, the on-token secure chip 213 transmits an identity authentication success notice to the control circuit 217 and agrees to accept the access request with respect to the on-token secure memory 215 transmitted from the control circuit 217.

In the operation 618, the on-card secure chip 121 verifies the user identification data transmitted from the control circuit 217 to conduct a card-side user identity authentication procedure. The on-card secure chip 121 may utilize various existing verification methods compare the user identification data transmitted from the control circuit 217 with the valid user identification data prestored in the on-card secure memory 223.

The user identification data transmitted from the control circuit 217 can pass the user identity authentication procedure conducted by the on-card secure chip 121 only if it matches the valid user identification data prestored in the on-card secure memory 223.

If the on-card secure chip 121 determines that the user identification data transmitted from the control circuit 217 matches the valid user identification data prestored in the on-card secure memory 223, then the on-card secure chip 121 performs the operation 620; otherwise, the on-card secure chip 121 transmits an identity authentication failure notice to the control circuit 217.

In the operation 620, the on-card secure chip 121 transmits an identity authentication success notice to the control circuit 217 and agrees to accept the access request with respect to the on-card secure memory 223 transmitted from the control circuit 217.

In the operation 622, the control circuit 217 receives the identity authentication failure notice transmitted from the on-token secure chip 213 and/or the on-card secure chip 121. In this embodiment, as long as the control circuit 217 receives the identity authentication failure notice transmitted from either the on-token secure chip 213 or the on-card secure chip 121, the control circuit 217 determines that the current user cannot pass the user identity authentication procedure conducted by the cryptography key backup device 100 and refuses to conduct the follow-up key backup operation.

In the operation 624, the control circuit 217 receives the identity authentication success notice transmitted from the on-token secure chip 213 and/or the on-card secure chip 121.

The control circuit 217 determines that the current user passes the user identity authentication procedure conducted by the cryptography key backup device 100 only if the user's identity is successfully confirmed by both the on-token secure chip 213 and the on-card secure chip 121. In this situation, the control circuit 217 then performs the operation 626.

In the operation 626, the control circuit 217 may parse the instructions and related operation parameters issued by the user according to the user's manipulation to the token device 110, and then conduct a corresponding key backup operation between the on-token secure chip 213 and the on-card secure chip 121.

As described previously, the control circuit 217 may identify if the operation type instructed by the user is a key backup operation or a key restoration operation according to the chronological order of the user's touch action and the user's card-placing action. In addition, the token device 110 may also determine the related operation parameters configured by the user, such as, the cryptography key backup schemes, the cryptography key restoration schemes, the total number of smart cards required during the cryptography key backup or restoration operation, or the like, according to the touching times and the card-placing times.

In practice, the control circuit 217 may compare the time point at which the first user's touch action taking place and the time point at which the first user's card-placing action taking place to identify the chronological order of the user's touch action and the user's card-placing action. Alternatively, the control circuit 217 may compare the time point at which the last user's touch action taking place and the time point at which the last user's card-placing action taking place to identify the chronological order of the user's touch action and the user's card-placing action.

In the embodiment of FIG. 6, if the control circuit 217 determines that the touching times, the card-placing times, and the chronological order of the user's touch action and the user's card-placing action match one specific manipulation scheme described in the aforementioned user behavior table 310, 410, or 510 of FIG. 3 through FIG. 5, then the control circuit 217 conducts the key backup operation corresponding to the specific manipulation scheme.

For example, if the control circuit 217 determines that the user's manipulations on the token device 110 match the user behavior pattern 311 or 312 described in the user behavior table 310 shown in FIG. 3, then the control circuit 217 copies a target key stored in the on-token secure memory 215 to the on-card secure memory 223 of a single smart card 120 for storing by utilizing a simple one-to-one backup approach. In this embodiment, the control circuit 217 may request the on-token secure chip 213 to provide the target key stored in the on-token secure memory 215, and transmit the target key provided by the on-token secure chip 213 to the on-card secure chip 121 of the smart card 120, and then instruct the on-card secure chip 121 to write the target key to the on-card secure memory 223 for storing.

As a result, the operation of backing up the target key stored in the token device 110 to a single smart card 120 can be completed. Afterwards, the control circuit 217 may control the indication circuit 117 to generate related progress indication messages, so as to inform the user that the key backup operation is completed.

For another example, if the control circuit 217 determines that the user's manipulations on the token device 110 match the user behavior pattern 413 or 414 described in the user behavior table 410 shown in FIG. 4, then the control circuit 217 copies a target key stored in the on-token secure memory 215 to multiple on-card secure memories 223 of multiple smart cards 120 for storing. In this embodiment, the control circuit 217 may transmit the target key provided by the on-token secure chip 213 to the on-card secure chip 121 of one smart card 120 and instruct the on-card secure chip 121 to write the target key to the on-card secure memory 223 for storing.

Then, the user may change the smart card accessed by the token device 110 one after another according to a predetermined time interval or related guiding messages generated by the indication circuit 117, so that the control circuit 217 can write the target key to the on-card secure memories 223 of other smart cards 120 through the smart card accessing circuit 211.

After the user changes multiple smart cards 120 one after another by following the instruction, the target key stored in the token device 110 thereby has multiple identical backup versions respectively stored in multiple different smart cards 120. Afterwards, the control circuit 217 may control the indication circuit 117 to generate related progress indication messages to inform the user that the key backup operation is completed.

For yet another example, if the control circuit 217 determines that the user's manipulations on the token device 110 match the user behavior pattern 515 or 516 described in the user behavior table 510, then the control circuit 217 backs up a target key stored in the on-token secure memory 215 to multiple on-card secure memories 223 of multiple smart cards 120 by utilizing a M-of-N backup approach. In this embodiment, the control circuit 217 may split the target key provided by the on-token secure chip 213 into multiple key data segments, or the on-token secure chip 213 may split the target key into multiple key data segments and transmit to the control circuit 217. The control circuit 217 then transmits one of the key data segments to the on-card secure chip 121 of one smart card 120 and instructs the on-card secure chip 121 to write the key data segment to the on-card secure memory 223 for storing.

Then, the user may change the smart card accessed by the token device 110 one after another according to a predetermined time interval or related guiding messages generated by the indication circuit 117, so that the control circuit 217 can write other key segments to the on-card secure memories 223 of other smart cards 120 through the smart card accessing circuit 211.

After the user changes multiple smart cards 120 one after another by following the instruction, the target key stored in the token device 110 thereby be backed up to multiple smart cards 120 by a M-of-N backup approach. Afterwards, the control circuit 217 may control the indication circuit 117 to generate related progress indication messages to inform the user that the key backup operation is completed.

Please note that the on-token secure chip 213 in each aforementioned embodiment may encrypt the target key (or related key data segment) by various encryption mechanisms pre-negotiated by the on-token secure chip 213 and the on-card secure chip 121, and then transmit the encrypted target key (or related key data segment) to the on-card secure chip 121 through the control circuit 217 for decryption.

The above operation can avoid the actual content of the target key from being obtained by the control circuit 217 during the cryptography key backup operation, so as to lower the possibility of leaking the content of the target key.

Afterwards, the user may need to restore the target key stored in one or more smart cards 120 into another token device 110 if the original token device 110 malfunctions or is missing. Alternatively, the user may need to restore the target key stored in one or more smart cards 120 into the original token device 110 if the target key stored in the original token device 110 is deleted due to various causes.

In other words, the token device 110 utilized by the user during the cryptography key restoration operation may be another token device, or may be the original token device.

Figure 7:
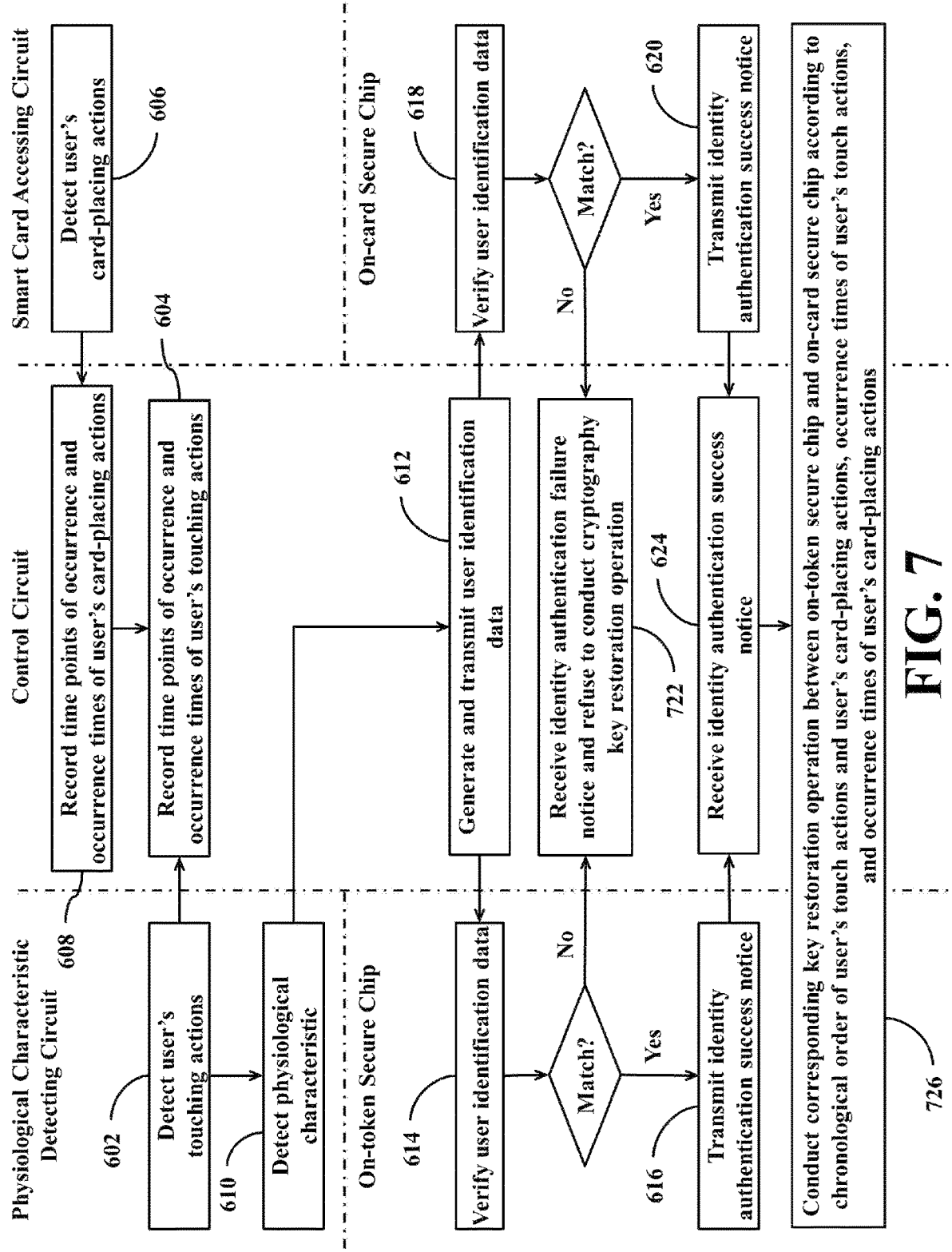
FIG. 7 shows a simplified flowchart of a cryptography key restoration method according to one embodiment of the present disclosure.

The cryptography key restoration operation of utilizing the cryptography key backup device 100 will be further described below with reference to FIG. 7. FIG. 7 shows a simplified flowchart of a cryptography key restoration method according to one embodiment of the present disclosure.

In the embodiment of FIG. 7, the token device 110 allows the user to issue related cryptography key backup instruction to the token device 110 by following the aforementioned manipulations, so as to instruct the token device 110 to restore the target key stored in one or more smart cards 120 into the on-token secure memory 215 of a single token device 110 by utilizing a corresponding restoration operation.

Similarly, during the user's manipulation on the cryptography key backup device 100, the token device 110 performs the operations 602, 604, 606, and 608 shown in FIG. 7 to identify the user's manipulation on the cryptography key backup device 100. In addition, the token device 110 also cooperates with the smart card 120 to perform the operation 610 through 620 to conduct the user identity authentication procedure, so as to verify the reality and validity of the user.

The aforementioned descriptions regarding the operations and related variations of the operation 602 through 620 shown in FIG. 6 are also applicable to the embodiment of FIG. 7. Therefore, for the sake of brevity, the detailed descriptions of the operation 602 through 620 will not be repeated here.

As shown in FIG. 7, the control circuit 217 receives the identity authentication failure notice transmitted from the on-token secure chip 213 and/or the on-card secure chip 121 in the operation 722. In this embodiment, as long as the control circuit 217 receives the identity authentication failure notice transmitted from either the on-token secure chip 213 or the on-card secure chip 121, then the control circuit 217 determines that the current user cannot pass the user identity authentication procedure conducted by the cryptography key backup device 100 and refuses to conduct the follow-up key restoration operation.

In the operation 624, the control circuit 217 receives an identity authentication success notice transmitted from the on-token secure chip 213 and/or the on-card secure chip 121.

The control circuit 217 determines that the current user passes the user identity authentication procedure conducted by the cryptography key backup device 100 only if the user's identity is successfully confirmed by both the on-token secure chip 213 and the on-card secure chip 121. In this situation, the control circuit 217 then performs the operation 726.

In the operation 726, the control circuit 217 may parse the instructions and related operation parameters issued by the user according to the user's manipulation to the token device 110, and then conduct a corresponding key restoration operation between the on-token secure chip 213 and the on-card secure chip 121.

As described previously, the control circuit 217 may identify if the operation type instructed by the user is a key backup operation or a key restoration operation according to the chronological order of the user's touch action and the user's card-placing action. In addition, the token device 110 may also determine the related operation parameters configured by the user, such as, the cryptography key backup schemes, the cryptography key restoration schemes, the total number of smart cards required during the cryptography key backup or restoration operation, or the like, according to the touching times and the card-placing times.

In the embodiment of FIG. 7, if the control circuit 217 determines that the touching times, the card-placing times, and the chronological order of the user's touch action and the user's card-placing action match one specific manipulation scheme described in the aforementioned user behavior table 320 or 520 of FIG. 3 through FIG. 5, then the control circuit 217 conducts the key restoration operation corresponding to the specific manipulation scheme.

For example, if the control circuit 217 determines that the user's manipulations on the token device 110 match the user behavior pattern 321 or 322 described in the user behavior table 320 shown in FIG. 3, then the control circuit 217 copies a target key stored in a single smart card 120 to the on-token secure memory 215 of a single token device 110 for storing by utilizing a simple one-to-one backup approach. In this embodiment, the control circuit 217 may request the on-card secure chip 121 to provide the target key stored in the on-card secure memory 223, and transmit the target key provided by the on-card secure chip 121 to the on-token secure chip 213, and then instruct the on-token secure chip 213 to write the target key to the on-token secure memory 215 for storing.

As a result, the operation of restoring the target key stored in a single smart card 120 to a single token device 110 can be completed. Afterwards, the control circuit 217 may control the indication circuit 117 to generate related progress indication messages, so as to inform the user that the key restoration operation is completed.

For another example, if the control circuit 217 determines that the user's manipulations on the token device 110 match the user behavior pattern 323 or 324 described in the user behavior table 320 shown in FIG. 4, then the control circuit 217 copies a target key stored in a single smart card 120 to the on-token secure memory 215 of a single token device 110 for storing by utilizing a simple one-to-one backup approach. In this embodiment, the control circuit 217 may request the on-card secure chip 121 to provide the target key stored in the on-card secure memory 223, and transmit the target key provided by the on-card secure chip 121 to the on-token secure chip 213, and then instruct the on-token secure chip 213 to write the target key to the on-token secure memory 215 for storing.

As a result, the operation of restoring the target key stored in a single smart card 120 to a single token device 110 can be completed. Afterwards, the control circuit 217 may control the indication circuit 117 to generate related progress indication messages, so as to inform the user that the key restoration operation is completed.

For yet another example, if the control circuit 217 determines that the user's manipulations on the token device 110 match the user behavior pattern 521 or 522 described in the user behavior table 520 shown in FIG. 5, then the control circuit 217 combines multiple key data segments respectively stored in a predetermined number of smart cards 120 by utilizing a many-to-one restoration approach, so as to restore the target key and copy the target key to the on-token secure memory 215 of a simple token device 110 for storing. In this embodiment, the control circuit 217 may request the on-card secure chip 121 of the first smart card 120 to provide the key data segment stored in the on-card secure memory 223.

Then, the user may change the smart card accessed by the token device 110 one after another according to a predetermined time interval or related guiding messages generated by the indication circuit 117, so that the control circuit 217 can read the key data segments stored in the on-card secure memories 223 of other smart cards 120 through the smart card accessing circuit 211.

In some embodiments, the control circuit 217 may restore the target key from the obtained key data segments and instruct the on-token secure chip 213 to write the target key to the on-token secure memory 215 for storing.

In some other embodiments, the control circuit 217 may transmit the obtained key data segments to the on-token secure chip 213, and instruct the on-token secure chip 213 to restore the target key from the above key data segments and write the target key to the on-token secure memory 215 for storing.

As a result, multiple key data segments respectively stored in multiple smart cards 120 would be restored into the target key and stored into a single token device 110. Afterwards, the control circuit 217 may control the indication circuit 117 to generate related progress indication messages, so as to inform the user that the key restoration operation is completed.

Please note that the on-card secure chip 121 in the aforementioned embodiments may first utilize various encryption mechanisms pre-negotiated by the on-card secure chip 121 and the on-token secure chip 213 to encrypt the target key (or related key data segments), and then transmit the encrypted target key (or related key data segments) to the on-token secure chip 213 through the control circuit 217 for decryption.

The above operation may avoid the actual content of the target key from being obtained by the control circuit 217 during the cryptography key restoration operation, so as to lower the possibility of leaking the content of the target key.

As can be appreciated from the foregoing descriptions, before the token device 110 conducts the key backup operation or the key restoration operation, the secure chips on both the token device 110 and the smart card 120 conduct a user identity authentication procedure. As long as the user identity authentication procedure on either the token device 110 or the smart card 120 fails, the user cannot pass the user identity authentication procedure, thus effectively prevents others from conducting unauthorized key backup operation or key restoration operation.

The aforementioned target key and valid user identification data are stored in the secure memories of secure chips. In this way, it improves the storage security of the target key and valid user identification data, and also lowers the possibility that hackers steal the target key and valid user identification data by intruding the token device 110 or the smart card 120.

The aforementioned token device 110 allows the user to issue related manipulation instructions for controlling the operations of the token device 110 by manipulating the chronological order of the user's touch action and the user's card-placing action. In addition, the token device 110 also allows the user to configure related operation parameters of the token device 110 by manipulating the touching times and the card-placing times.

The aforementioned user's manipulations of the token device 110 are simple and intuitive, and does not require the use of conventional command input devices, such as a command button, a keyboard, a touching panel, or the like, thereby effectively reducing the circuit complexity and weight of the token device 110.

Moreover, during conducting the key backup or restoration operation, the token device 110 operates independently and does not require the user to manipulate the operation of the token device 110 by utilizing additional devices, such as, other computers, cell phones, mobile devices, or the like. Therefore, during the aforementioned key backup or restoration operation, the control circuit 217 of the token device 110 isn't controlled by other devices. As a result, hackers or other malicious people have no chance to steal the content of the target key by intruding the control circuit 217 during the aforementioned key backup or restoration operation.

Figure 8:
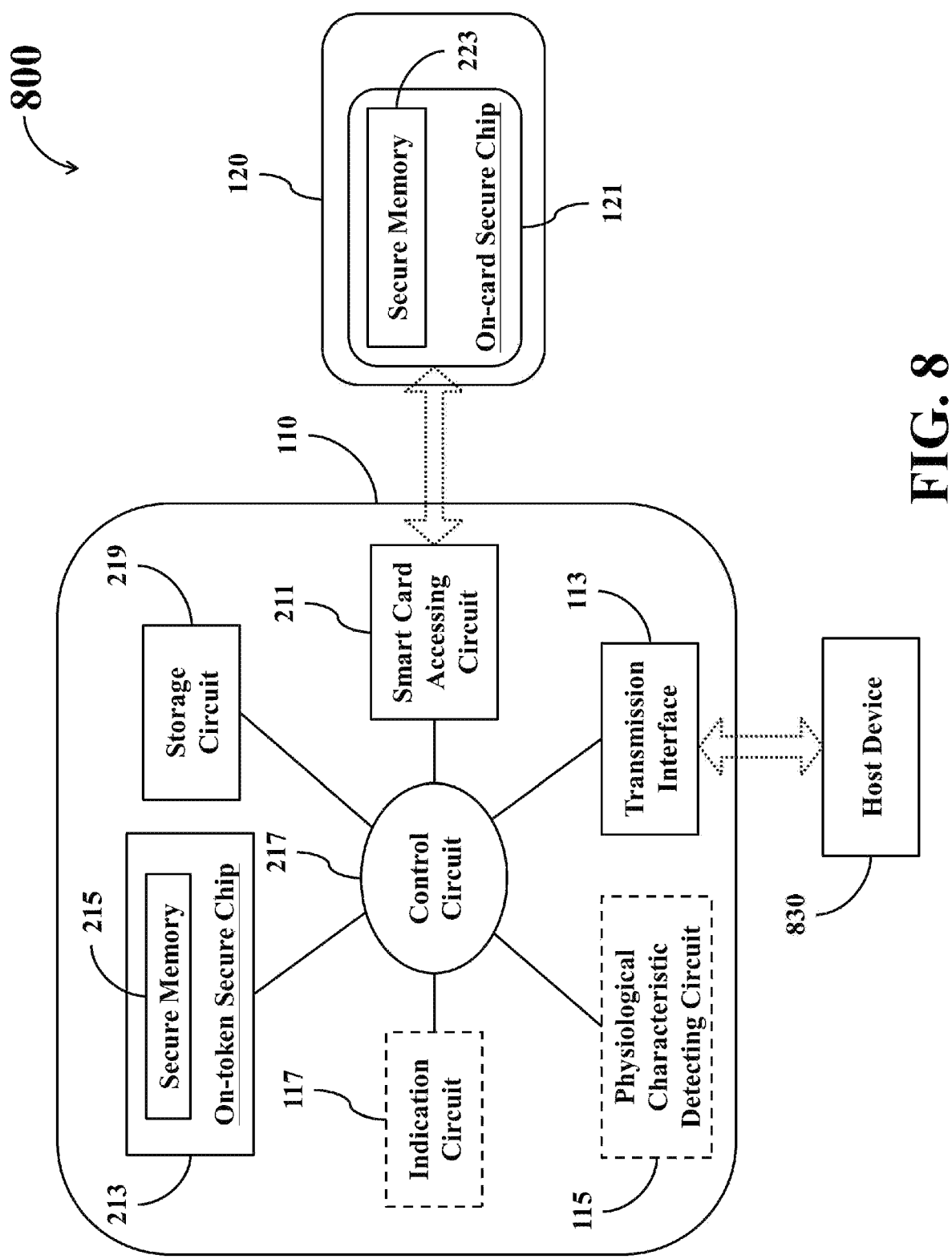
FIG. 8 shows a simplified functional block diagram of a cryptography key backup system according to one embodiment of the present disclosure.

Please refer to FIG. 8, which shows a simplified functional block diagram of a cryptography key backup system 800 according to one embodiment of the present disclosure. As shown in FIG. 8, the cryptography key backup system 800 comprises the aforementioned token device 110, one or more smart cards 120, and a host device 830. The cryptography key backup system 800 is arranged to operably allow the user to utilize the host device 830 to instruct the token device 110 to conduct the key backup or restoration operation between one or more smart cards 120.

The aforementioned descriptions regarding the connections and implementations of other components of the token device 110 shown in FIG. 1 and FIG. 2 are also applicable to the embodiment of FIG. 8, but the operation of the token device 110 in the embodiment of FIG. 8 is partially different from the aforementioned token device 110 shown in FIG. 1 and FIG. 2.

For example, in the embodiment of FIG. 8, the transmission interface 113 of the token device 110 is arranged to operably receive power required for the operation of the token device 110 from the host device 830 and to operably communicate data with the host device 830, so as to receive a host authentication data transmitted from the host device 830.

In practice, the host device 830 may be realized by various computing devices that are capable of communicating data and commands with the token device 110, such as a desktop computer, a notebook computer, a tablet computer, a cell phone, or the like.

In addition, the control circuit 217 shown in FIG. 8 is arranged to operably generate related user identification data comprising the host authentication data, and to respectively transmit the generated user identification data to the on-card secure chips 121 of the smart card 120 and the on-token secure chip 213.

In the cryptography key backup system 800, if the user's identity is successfully confirmed by both the on-token secure chip 213 and the on-card secure chip 121, then the control circuit 217 of the token device 110 conducts a corresponding key backup operation or a corresponding key restoration operation between the on-token secure chip 213 and the on-card secure chip 121 according to the instructions from the host device 830.

Figure 9:
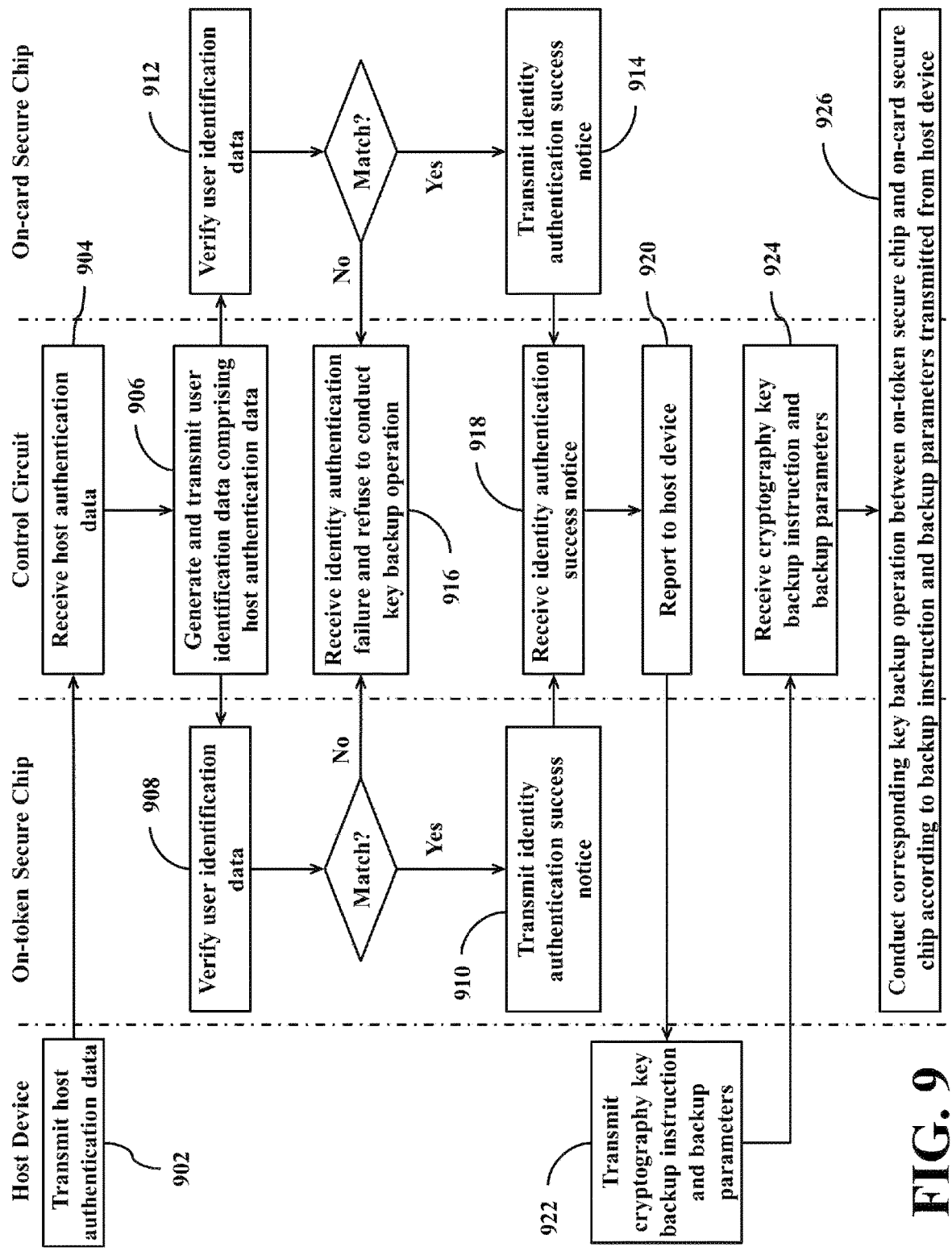
FIG. 9 shows a simplified flowchart of a cryptography key backup method according to another embodiment of the present disclosure.

The method of utilizing the cryptography key backup system 800 to conduct a cryptography key backup operation will be further described below with reference to FIG. 9. FIG. 9 shows a simplified flowchart of a cryptography key backup method according to another embodiment of the present disclosure.

In the embodiment of FIG. 9, the user may issue related cryptography key backup instructions and backup parameters to the token device 110 through the host device 830, so as to instruct the token device 110 to back up the target key stored in the on-token secure memory 215 into one or more smart cards 120 by utilizing a corresponding backup scheme.

In practice, the host device 830 may provide a related user manipulation interface for the user to issue the aforementioned cryptography key backup instructions and configure related backup parameters.

Before conducting the key backup operation, the cryptography key backup system 800 performs the operations 902 through 914 to conduct the user identity authentication procedure, so as to verify the reality and validity of the user.

In the operation 902, the host device 830 transmits a host authentication data to the token device 110.

In one embodiment, the host device 830 may adopt various existing mechanisms to actively generate an identification data that can be used to verify the identity of the host device 830 as the host authentication data, and transmit the host authentication data to the token device 110 in the operation 902. For example, the host device 830 may conduct electronic signature to specific data by utilizing its private key to generate a corresponding signature value as the host authentication data. For another example, the host device 830 may adopt a suitable algorithm to generate a password or an identification code corresponding to the current time point to be the host authentication data.

In another embodiment, the host device 830 may passively generate an identification data that can be used to verify the identity of the host device 830 as the host authentication data after receiving a request from the token device 110 or the smart card 120, and transmit the host authentication data to the token device 110 in the operation 902. For example, the host device 830 may adopt various suitable challenge-response algorithms to generate a response value corresponding to the request from the token device 110 or the smart card 120 to be the host authentication data. For another example, the host device 830 may adopt a suitable algorithm to generate a password or an identification code corresponding to the current time point to be the host authentication data after receiving a request from the token device 110 or the smart card 120.

In the operation 904, the control circuit 217 of the token device 110 receives the host authentication data transmitted from the host device 830 through the transmission interface 113.

In the operation 906, the control circuit 217 generates a user identification data comprising the host authentication data.

In practice, the host device 830 may request the user to provide data that can be used to identify the user's identity, so that the control circuit 217 can perform the aforementioned operation 906 accordingly.

For example, in one embodiment, the host device 830 may request the user to input a password through the input interface of the host device 830, and then transmit the user's password to the control circuit 217. In this embodiment, the control circuit 217 may combine or encode the host authentication data and the user's password by using various approaches to generate a user identification data, so that the user identification data comprises the host authentication data and the user's password.

In another embodiment, the host device 830 may request the user to touch the physiological characteristic detecting circuit 115 of the token device 110. In the meantime, the physiological characteristic detecting circuit 115 scans the user's fingerprint and transmits the detecting result to the control circuit 217. The control circuit 217 generates a fingerprint data corresponding to the detecting result transmitted from the physiological characteristic detecting circuit 115. In this embodiment, the control circuit 217 may combine or encode the host authentication data and the aforementioned fingerprint data by using various approaches to generate a user identification data, so that the user identification data comprises the host authentication data and the user's fingerprint data.

In yet another embodiment, the host device 830 may utilize other physiological characteristics extract circuits (e.g., an iris scanner, a palm scanner, a face scanner, etc.) to obtain the user's physiological characteristics data, and transmit the obtained physiological characteristics data to the control circuit 217. In this embodiment, the control circuit 217 may combine the host authentication data and the aforementioned physiological characteristics data by using various approaches to generate a user identification data, so that the user identification data comprises the host authentication data and the physiological characteristics data corresponding to the user.

In addition, the control circuit 217 respectively transmits the generated user identification data to the on-token secure chip 213 and the on-card secure chip 121 for verifying the user's identity.

In the cryptography key backup system 800, the on-token secure memory 215 and the on-card secure memory 223 are prestored with the valid user identification data that can be used to verify the validity of the aforementioned user identification data. In some embodiments, the on-token secure memory 215 and the on-card secure memory 223 may be also prestored with the public key of the host device 830.

In practice, the on-token secure memory 215 and the on-card secure memory 223 may store identical valid user identification data or may store different user identification data of the same valid user.

For example, in some embodiments, the valid user identification data stored in the on-token secure memory 215 corresponds to a combination of the host authentication data and a first password inputted by the user, while the valid user identification data stored in the on-card secure memory 223 corresponds to a combination of the host authentication data and a second password inputted by the user.

For another example, in some embodiments, the valid user identification data stored in the on-token secure memory 215 corresponds to a combination of the host authentication data and a certain physiological characteristic (e.g., the right index finger print) of the valid user, while the valid user identification data stored in the on-card secure memory 223 corresponds to a combination the host authentication data and another physiological characteristic (e.g., the left index finger print) of the valid user.

In the embodiments where the valid user identification data prestored in the on-token secure memory 215 and the on-card secure memory 223 are identical, the control circuit 217 may transmit the identical user identification data to the on-token secure chip 213 and the on-card secure chip 121 for verifying the user's identity.

In the embodiments where the valid user identification data stored in the on-token secure memory 215 and the on-card secure memory 223 are different, the user identification data transmitted to the on-token secure chip 213 by the control circuit 217 may be different from the user identification data transmitted to the on-card secure chip 121 by the control circuit 217.

For example, the user may provide different fingerprints (e.g., the right index finger print and the left index finger print) one after another to the physiological characteristic detecting circuit 115 for scanning according to the order instructed by the host device 830. In this situation, the control circuit 217 may generate two different user identification data one after another. The control circuit 217 may transmit one of the user identification data to the on-token secure chip 213 for verifying the user's identity and transmit another user identification data to the on-card secure chip 121 for verifying the user's identity.

In the operation 908, the on-token secure chip 213 verifies the user identification data transmitted from the control circuit 217 to conduct a token-side user identity authentication procedure. The on-token secure chip 213 may utilize various existing verification methods to compare the user identification data transmitted from the control circuit 217 and the valid user identification data prestored in the on-token secure memory 215.

The user identification data transmitted from the control circuit 217 can pass the user identity authentication procedure conducted by the on-token secure chip 213 only if it matches the valid user identification data prestored in the on-token secure memory 215.

If the on-token secure chip 213 determines that the user identification data transmitted from the control circuit 217 matches the valid user identification data prestored in the on-token secure memory 215, then the on-token secure chip 213 performs the operation 910; otherwise, the on-token secure chip 213 transmits an identity authentication failure notice to the control circuit 217.

In the operation 910, the on-token secure chip 213 transmits an identity authentication success notice to the control circuit 217 and agrees to accept the access request with respect to the on-token secure memory 215 transmitted from the control circuit 217.

In the operation 912, the on-card secure chip 121 verifies the user identification data transmitted from the control circuit 217 to conduct a card-side user identity authentication procedure. The on-card secure chip 121 may utilize various existing verification methods to compare the user identification data transmitted from the control circuit 217 and the valid user identification data prestored in the on-card secure memory 223.

The user identification data transmitted from the control circuit 217 can pass the user identity authentication procedure conducted by the on-card secure chip 121 only if it matches the valid user identification data prestored in the on-card secure memory 223.

If the on-card secure chip 121 determines that the user identification data transmitted from the control circuit 217 matches the valid user identification data prestored in the on-card secure memory 223, then the on-card secure chip 121 performs the operation 914; otherwise, the on-card secure chip 121 transmits an identity authentication failure notice to the control circuit 217.

In the operation 914, the on-card secure chip 121 transmits an identity authentication success notice to the control circuit 217 and agrees to accept the access request with respect to the on-card secure memory 223 transmitted from the control circuit 217.

In the operation 916, the control circuit 217 receives the identity authentication failure notice transmitted from the on-token secure chip 213 and/or the on-card secure chip 121. In this embodiment, as long as the control circuit 217 receives the identity authentication failure notice transmitted from either the on-token secure chip 213 or the on-card secure chip 121, then the control circuit 217 refuses to conduct the follow-up key backup operation and report the result to the host device 830.

In the operation 918, the control circuit 217 receives an identity authentication success notice transmitted from the on-token secure chip 213 and/or the on-card secure chip 121.

The control circuit 217 determines that the current user passes the user identity authentication procedure conducted by the cryptography key backup system 800 only if the user's identity is successfully confirmed by both the on-token secure chip 213 and the on-card secure chip 121. In this situation, the control circuit 217 then performs the operation 920.

In the operation 920, the control circuit 217 reports the result of that the user passes the user identity authentication procedure conducted by the token device 110 and the smart card 120 to the host device 830.

In the operation 922, the host device 830 may transmit the cryptography key backup instructions and related backup parameters configured by the user to the token device 110.

In the operation 924, the control circuit 217 of the token device 110 receives the cryptography key backup instructions and related backup parameters transmitted from the host device 830.

In the operation 926, the control circuit 217 may conduct a corresponding key backup operation between the on-token secure chip 213 and the on-card secure chip 121 according to the cryptography key backup instructions and related backup parameters transmitted from the host device 830.

For example, in the case of that the host device 830 instructs the token device 110 to conduct a simple one-to-one backup operation, the control circuit 217 may request the on-token secure chip 213 to provide the target key stored in the on-token secure memory 215, and transmit the target key provided by the on-token secure chip 213 to the on-card secure chip 121 of the smart card 120, and also instruct the on-card secure chip 121 to write the target key to the on-card secure memory 223 for storing.

As a result, the operation of backing up the target key stored in a single token device 110 to a single smart card 120 can be completed.

For another example, in the case of that the host device 830 instructs the token device 110 to conduct a simple one-to-many backup operation, the control circuit 217 may transmit the target key provided by the on-token secure chip 213 to the on-card secure chip 121 of the smart card 120, and instruct the on-card secure chip 121 to write the target key to the on-card secure memory 223 for storing.

Then, the user may change the smart card accessed by the token device 110 one after another according to the instruction of the host device 830 or related guiding messages generated by the indication circuit 117, so that the control circuit 217 can write the target key to the on-card secure memories 223 of other smart cards 120 one after another through the smart card accessing circuit 211.

After the user changes multiple smart cards 120 one after another by following the instruction, the target key stored in the token device 110 thereby has multiple identical backup versions respectively stored in multiple different smart cards 120.

For yet another example, in the case of that the host device 830 instructs the token device 110 to conduct a M-of-N backup operation, the control circuit 217 may split the target key provided by the on-token secure chip 213 into multiple key data segments, or the on-token secure chip 213 may split the target key into multiple key data segments and transmit to the control circuit 217. The control circuit 217 transmits a certain key data segment to the on-card secure chip 121 of the smart card 120, and instructs the on-card secure chip 121 to write the key data segment to the on-card secure memory 223 for storing.

Then, the user may change the smart card accessed by the token device 110 one after another according to the instruction of the host device 830 or related guiding messages generated by the indication circuit 117, so that the control circuit 217 can write other key data segments to the on-card secure memories 223 of other smart cards 120 one after another through the smart card accessing circuit 211.

After the user changes multiple smart cards 120 one after another by following the instruction, the target key stored in the token device 110 thereby be backed up to multiple smart cards 120 by a M-of-N backup approach.

Please note that the on-token secure chip 213 in each aforementioned embodiment may encrypt the target key (or related key data segment) by various encryption mechanisms pre-negotiated by the on-token secure chip 213 and the on-card secure chip 121, and then transmit the encrypted target key (or related key data segment) to the on-card secure chip 121 through the control circuit 217 for decryption.

The above operation can avoid the actual content of the target key from being obtained by the control circuit 217 during the cryptography key backup operation, so as to lower the possibility that malicious people steals the target key by intruding the host device 830 or the control circuit 217.

Afterwards, the user may need to restore the target key stored in one or more smart cards 120 into another token device 110 if the original token device 110 malfunctions or is missing. Alternatively, the user may need to restore the target key stored in one or more smart cards 120 into the original token device 110 if the target key stored in the original token device 110 is deleted due to various causes.

In other words, the token device 110 utilized by the user during the cryptography key restoration operation may be another token device, or may be the original token device.

Figure 10:
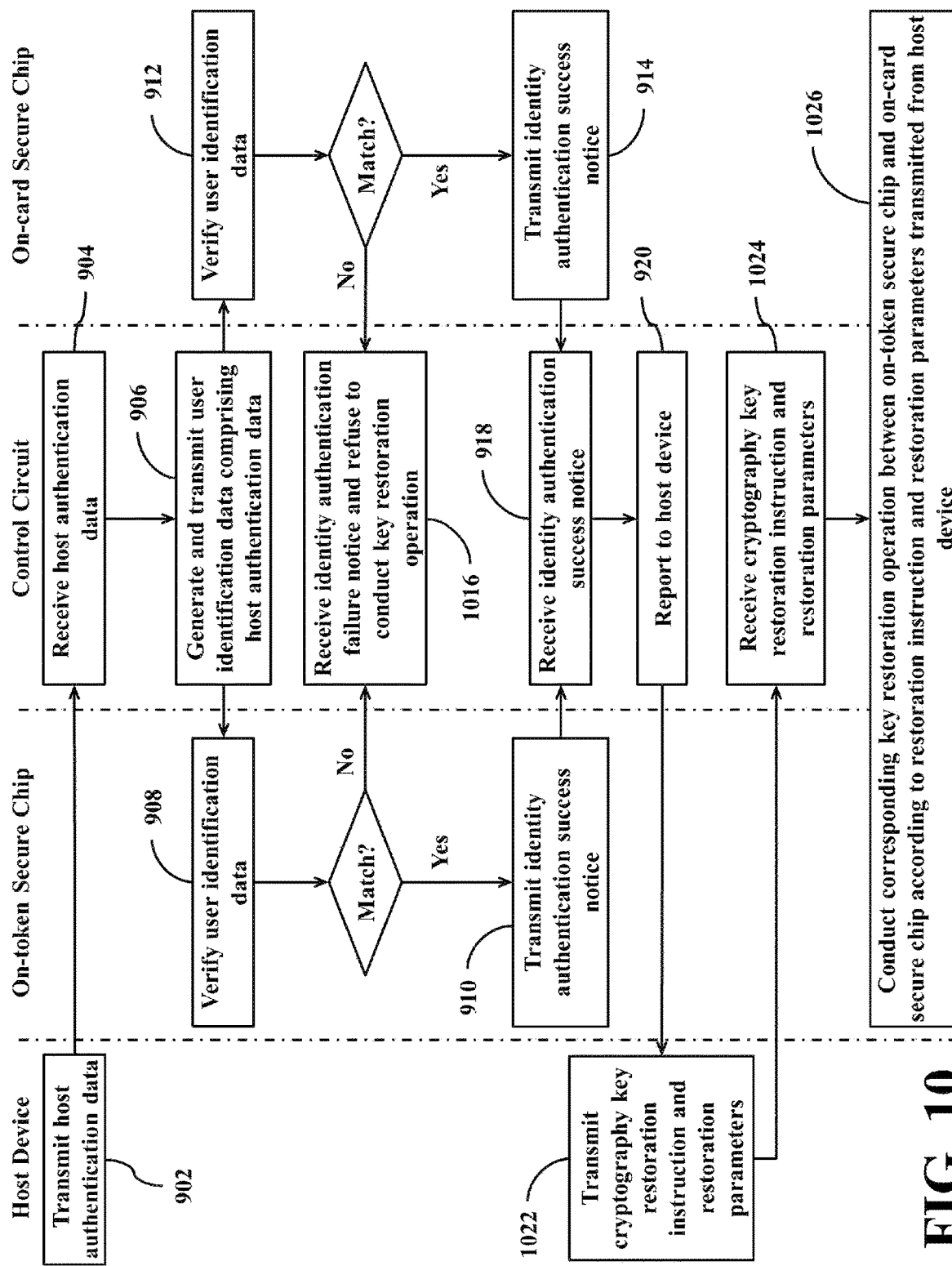
FIG. 10 shows a simplified flowchart of a cryptography key restoration method according to another embodiment of the present disclosure.

The method of utilizing the cryptography key backup system 800 to conduct a cryptography key restoration operation will be further described below with reference to FIG. 10. FIG. 10 shows a simplified flowchart of a cryptography key restoration method according to another embodiment of the present disclosure.

In the embodiment of FIG. 10, the user may issue related cryptography key restoration instructions and restoration parameters to the token device 110 through the host device 830, so as to instruct the token device 110 to restore the target key stored in one or more smart cards 120 into the on-token secure memory 215 of a single token device 110 by utilizing a corresponding restoration scheme.

Similarly, the host device 830 may provide a related user manipulation interface for the user to issue the aforementioned cryptography key restoration instructions and configure related restoration parameters.

Before conducting the key restoration operation, the cryptography key backup system 800 performs the operations 902 through 914 shown in FIG. 10 as well to conduct the user identity authentication procedure, so as to verify the reality and validity of the user.

The aforementioned descriptions regarding the operations and related variations of the operations 902 through 914 shown in FIG. 9 are also applicable to the embodiment of FIG. 10. Therefore, for the sake of brevity, the detailed descriptions of the operations 902 through 914 will not be repeated here.

As shown in FIG. 10, the control circuit 217 receives the identity authentication failure notice transmitted from the on-token secure chip 213 and/or the on-card secure chip 121 in the operation 1016. In this embodiment, as long as the control circuit 217 receives the identity authentication failure notice transmitted from either the on-token secure chip 213 or the on-card secure chip 121, then the control circuit 217 refuses to conduct the follow-up key restoration operation and reports the result to the host device 830.

In the operation 918, the control circuit 217 receives an identity authentication success notice transmitted from the on-token secure chip 213 and/or the on-card secure chip 121.

The control circuit 217 determines that the current user passes the user identity authentication procedure conducted by the cryptography key backup system 800 only if the user's identity is successfully confirmed by both the on-token secure chip 213 and the on-card secure chip 121. In this situation, the control circuit then performs the operation 920.

In the operation 920, the control circuit 217 reports the result of that the user passes the user identity authentication procedure conducted by the token device 110 and the smart card 120 to the host device 830.

In the operation 1022, the host device 830 may transmit the cryptography key restoration instructions and related restoration parameters configured by the user to the token device 110.

In the operation 1024, the control circuit 217 of the token device 110 receives the cryptography key restoration instructions and related restoration parameters transmitted from the host device 830.

In the operation 1026, the control circuit 217 may conduct a corresponding key restoration operation between the on-token secure chip 213 and the on-card secure chip 121 according to the cryptography key restoration instructions and related restoration parameters transmitted from the host device 830.

For example, in the case of that the host device 830 instructs the token device 110 to conduct a simple one-to-one backup operation, the control circuit 217 may request the on-card secure chip 121 to provide the target key stored in the on-card secure memory 223, and transmit the target key provided by the on-card secure chip 121 to the on-token secure chip 213, and also instruct the on-token secure chip 213 to write the target key to the on-token secure memory 215 for storing.

As a result, the operation of restoring the target key stored in a single smart card 120 to a single token device 110 can be completed.

For another example, in the case of that the host device 830 instructs the token device 110 to conduct a many-to-one restoration operation, the control circuit 217 may request the on-card secure chip 121 of the first smart card 120 to provide the key data segments stored in the on-card secure memory 223.

Then, the user may change the smart card accessed by the token device 110 one after another according to the instruction of the host device 830 or related guiding messages generated by the indication circuit 117, so that the control circuit 217 can read the key data segments stored in the on-card secure memories 223 of other smart cards 120 through the smart card accessing circuit 211.

In some embodiments, the control circuit 217 may restore the target key from the obtained key data segments and instruct the on-token secure chip 213 to write the target key to the on-token secure memory 215 for storing.

In some other embodiments, the control circuit 217 may transmit the obtained key data segments to the on-token secure chip 213, and instruct the on-token secure chip 213 to restore the target key from the above key data segments and write the target key to the on-token secure memory 215 for storing.

As a result, multiple key data segments respectively stored in multiple smart cards 120 would be restored into the target key and stored into a single token device 110.

Please note that the on-card secure chip 121 in the aforementioned embodiments may first utilize various encryption mechanisms pre-negotiated by the on-card secure chip 121 and the on-token secure chip 213 to encrypt the target key (or related key data segments), and then transmit the encrypted target key (or related key data segments) to the on-token secure chip 213 through the control circuit 217 for decryption.

The above operation can avoid the actual content of the target key from being obtained by the control circuit 217 during the cryptography key restoration operation, so as to lower the possibility that malicious people steal the target key by intruding the host device 830 or the control circuit 217.

As can be appreciated from the foregoing descriptions, the physiological characteristic detecting circuit 115 in the embodiment of FIG. 8 doesn't need to detect the aforementioned user's touch action, and the smart card accessing circuit 211 doesn't need to detect the aforementioned user's card-placing action. In addition, the control circuit 217 in FIG. 8 doesn't need to record the time points of occurrence and the occurrence times of the aforementioned user's touch actions, nor the timepoints of occurrence and occurrence times of the aforementioned user's card-placing actions.

It can be appreciated from the foregoing descriptions that before the token device 110 conducts the key backup operation or the key restoration operation, the secure chips on both the token device 110 and the smart card 120 would conduct a user identity authentication procedure. As long as the user identity authentication procedure on either the token device 110 or the smart card 120 fails, the user cannot pass the user identity authentication procedure, thus effectively prevents others from conducting unauthorized key backup operation or key restoration operation.

The aforementioned target key and valid user identification data are stored in the secure memories of secure chips. In this way, it improves the storage security of the target key and valid user identification data, and also lowers the possibility that hackers steal the target key and valid user identification data by intruding the host device 830, the token device 110, or the smart card 120.

In addition, in the cryptography key backup system 800, the user is allowed to pass the user identity authentication procedure respectively conducted by the token device 110 and the smart card 120 only if the user identification data generated by the control circuit 217 of the token device 110 comprises the host authentication data provided by the host device 830. In other words, the user cannot pass the user identity authentication procedure respectively conducted by the token device 110 and the smart card 120 without having the host authentication data.

From another aspect, the aforementioned identity authentication procedure conducted by the cryptography key backup system 800 equivalently imposes an additional restriction to the backup or restoration operation of the target key. That is, the backup or restoration operation of the target key is constrained to be conducted only at the position where the host device 830 resides, and is constrained to be conducted only by the person who has the access right to the host device 830.

As a result, as long as the organization or corporation to which the host device 830 belongs improves the management of the access right to the host device 830, the risk that various keys of the organization or corporation are illegally copied or stolen can be effectively decreased.

Please note that the executing order of the operations of FIG. 9 and FIG. 10 is merely an example rather than a restriction to the practical implementations. For example, the operations 922 and 902 of FIG. 9 may be performed simultaneously. Alternatively, the operations 922 and 924 may be performed before the operation 902.

For another example, the operations 1022 and 902 of FIG. 10 may be performed simultaneously. Alternatively, the operations 1022 and 1024 may be performed before the operation 902.

In addition, the circuit structure of the token device 110 described in the aforementioned embodiments is merely an example rather than a restriction to the practical implementations.

For example, the position, specification, and/or quantity of the transmission interface 113 of the aforementioned token device 110 may be modified according to the requirement of practical applications.

The position, quantity, and/or detecting mechanism of the physiological characteristic detecting circuit 115 of the aforementioned token device 110 may be modified according to the requirement of practical applications. For example, in the embodiment where the physiological characteristic detecting circuit 115 is utilized to detect the user's electrocardiogram, at least two physiological characteristic detecting circuits 115 should be arranged in the token device 110. When the user utilizes his/her body portions on opposing side of the heart to respectively touch the two physiological characteristic detecting circuits 115, the two physiological characteristic detecting circuits 115 can measure the electrocardiogram signals of the user.

In practice, the indication circuit 117 of the aforementioned token device 110 may be omitted. In this situation, the user may estimate the related operating progress of the aforementioned token device 110 by himself/herself according to the instructions of the user manual of the token device 110 or other guiding documents.

In addition, the position of the card slot 119 of the token device 110 may be modified according to the requirement of practical circuit designs. In some embodiments where the smart card accessing circuit 211 is realized with contactless circuit structures, the card slot 119 may even be omitted.

In the aforementioned embodiments of FIG. 6 and FIG. 7, the control circuit 217 of the token device 110 may be instead arranged to operably identify the operating type instructed by the user simply according to the chronological order of the user's touch action and the user's card-placing action, while omitting the operation of recording the touching times and the card-placing times, so as to simplify the determining complexity and required computing load of the control circuit 217.

In some embodiments, the token device 110 may omit the transmission interface 113 and utilize a built-in miniaturized battery to provide the power required for the operation of the internal components of the token device 110.

In addition, in some embodiments, the aforementioned physiological characteristic detecting circuit 115 shown in FIG. 8 may also be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A token device of a cryptography key backup device, comprising:
   a transmission interface arranged to operably receive power required for operations of the token device from an external device;
   a physiological characteristic detecting circuit arranged to operably detect user's touch actions and the user's physiological characteristics;
   a smart card accessing circuit arranged to operably detect user's card-placing actions, and arranged to operably access an on-card secure chip positioned on a smart card wherein the on-card secure chip comprises a built-in on-card secure memory;
   an on-token secure chip comprising a built-in on-token secure memory; and
   a control circuit coupled with the transmission interface, the physiological characteristic detecting circuit, the smart card accessing circuit, and the on-token secure chip, and arranged to operably generate one or more user identification data corresponding to a detecting result of the physiological characteristic detecting circuit, to operably transmit a first user identification data to the on-token secure chip for verifying a user's identity, and to operably transmit a second user identification data to the on-card secure chip for verifying the user's identity;
   wherein if the user's identity is successfully confirmed by both the on-token secure chip and the on-card secure chip, the control circuit conducts a corresponding key backup operation or key restoration operation between the on-token secure chip and the on-card secure chip wherein if the user's identity is successfully confirmed by both the on-token secure chip and the on-card secure chip, the control circuit conducts the corresponding key backup operation or key restoration operation between the on-token secure chip and the on-card secure chip according to a chronological order of the user's touch actions and the user's card-placing actions.

2. The token device of claim 1, wherein a target key is prestored in the on-token secure memory, and if the user's identity is successfully confirmed by both the on-token secure chip and the on-card secure chip, and the user's touch actions took place prior to the user's card-placing actions, then the on-token secure chip transmits the target key to the control circuit, and the control circuit transmits the target key to the on-card secure chip, so that the on-card secure chip stores the target key in the on-card secure memoryto conduct a key backup operation.

3. The token device of claim 2, wherein the first user identification data is identical to the second user identification data.

4. The token device of claim 2, wherein the first user identification data is different from the second user identification data.

5. The token device of claim 1, wherein a target key is prestored in the on-card secure memory, and if the user's identity is successfully confirmed by both the on-token secure chip and the on-card secure chip, and the user's card-placing actions took place prior to the user's touch actions, then the on-card secure chip transmits the target key to the control circuit, and the control circuit transmits the target key to the on-token secure chip, so that the on-token secure chip stores the target key in the on-token secure memory to conduct a key restoration operation.

6. The token device of claim 5, wherein the first user identification data is identical to the second user identification data.

7. The token device of claim 5, wherein the first user identification data is different from the second user identification data.

8. The token device of claim 1, wherein a target key is prestored in the on-token secure memory, and if the user's identity is successfully confirmed by both the on-token secure chip and the on-card secure chip, and the user's card-placing actions took place prior to the user's touch actions, then the on-token secure chip transmits the target key to the control circuit, and the control circuit transmits the target key to the on-card secure chip, so that the on-card secure chip stores the target key in the on-card secure memory to conduct a key backup operation.

9. The token device of claim 8, wherein the first user identification data is identical to the second user identification data.

10. The token device of claim 8, wherein the first user identification data is different from the second user identification data.

11. The token device of claim 1, wherein a target key is prestored in the on-card secure memory, and if the user's identity is successfully confirmed by both the on-token secure chip and the on-card secure chip, and the user's touch actions took place prior to the user's card-placing actions, then the on-card secure chip transmits the target key to the control circuit, and the control circuit transmits the target key to the on-token secure chip, so that the on-token secure chip stores the target key in the on-token secure memory to conduct a key restoration operation.

12. The token device of claim 11, the first user identification data is identical to the second user identification data.

13. The token device of claim 11, wherein the first user identification data is different from the second user identification data.

14. The token device of claim 1, wherein the physiological characteristic detecting circuit is arranged to operably inform the control circuit of that one user's touch action occurs at each time the physiological characteristic detecting circuit is being touched, and the smart card accessing circuit is arranged to operably inform the control circuit of that one user's card-placing action occurs once the smart card accessing circuit finds that the smart card or another card is being placed or moved to a position which can be detected by the smart card accessing circuit.

15. The token device of claim 1, wherein the control circuit is further arranged to operably determine a quantity of required smart cards to be employed in the key backup operation or the key restoration operation according to a number of times the user's touch actions occur or a number of times the user's card-placing actions occur.

16. The token device of claim 1, further comprising:
an indication circuit coupled with the control circuit, and arranged, under control of the control circuit, to operably generate an indication message for representing a related operation progress or generate an indication message for guiding the user to change a smart card to be accessed by the smart card accessing circuit.

17. A token device of a cryptography key backup system, comprising:
a transmission interface arranged to operably communicate data with a host device of the cryptography key backup system, and arranged to operably receive a host authentication data transmitted from the host device;
a smart card accessing circuit arranged to operably access an on-card secure chip positioned on a smart card, wherein the on-card secure chip comprises a built-in on-card secure memory;
an on-token secure chip comprising a built-in on-token secure memory; and
a control circuit coupled with the transmission interface, the smart card accessing circuit, and the on-token secure chip, and arranged to operably generate one or more user identification data comprising the host authentication data, to operably transmit a first user identification data to the on-token secure chip for verifying a user's identity, and to operably transmit a second user identification data to the on-card secure chip for verifying the user's identity; and
a physiological characteristic detecting circuit coupled with the control circuit and arranged to operably detect the user's physiological characteristics;
wherein the control circuit is further arranged to operably generate a physiological characteristic data corresponding to a detecting result of the physiological characteristic detecting circuit, while each of the first user identification data and the second user identification data comprises the host authentication data and the physiological characteristic data;
wherein if the user's identity is successfully confirmed by both the on-token secure chip and the on-card secure chip, the control circuit conducts a corresponding key backup operation or key restoration operation between the on-token secure chip and the on-card secure chip according to instructions by the host device.

18. The token device of claim 17, wherein the first user identification data is identical to the second user identification data.

19. The token device of claim 18, wherein each of the first user identification data and the second user identification data comprises the host authentication data and a set of passwords entered by the user.

20. The token device of claim 18, wherein each of the first user identification data and the second user identification data comprises the host authentication data and a physiological characteristic data corresponding to the user.

21. The token device of claim 17, wherein the first user identification data is different from the second user identification data.

22. The token device of claim 21, wherein the first user identification data comprises the host authentication data and a first set of passwords entered by the user, while the second user identification data comprises the host authentication data and a second set of passwords entered by the user.

23. A token device of a cryptography key backup system, comprising:
- a transmission interface arranged to operably communicate data with a host device of the cryptography key backup system, and arranged to operably receive a host authentication data transmitted from the host device;
- a smart card accessing circuit arranged to operably access an on-card secure chip positioned on a smart card, wherein the on-card secure chip comprises a built-in on-card secure memory;
- an on-token secure chip comprising a built-in on-token secure memory; and
- a control circuit coupled with the transmission interface, the smart card accessing circuit, and the on-token secure chip, and arranged to operably generate one or more user identification data comprising the host authentication data, to operably transmit a first user identification data to the on-token secure chip for verifying a user's identity, and to operably transmit a second user identification data to the on-card secure chip for verifying the user's identity;
- wherein the first user identification data comprises the host authentication data and a first physiological characteristic data corresponding to the user, while the second user identification data comprises the host authentication data and a second physiological characteristic data corresponding to the users;
- wherein if the user's identity is successfully confirmed by both the on-token secure chip and the on-card secure chip, the control circuit conducts a corresponding key backup operation or key restoration operation between the on-token secure chip and the on-card secure chip according to instructions by the host device.

24. A token device of a cryptography key backup system, comprising:
- a transmission interface arranged to operably communicate data with a host device of the cryptography key backup system, and arranged to operably receive a host authentication data transmitted from the host device;
- a smart card accessing circuit arranged to operably access an on-card secure chip positioned on a smart card, wherein the on-card secure chip comprises a built-in on-card secure memory;
- an on-token secure chip comprising a built-in on-token secure memory;
- a control circuit coupled with the transmission interface, the smart card accessing circuit, and the on-token secure chip, and arranged to operably generate one or more user identification data comprising the host authentication data, to operably transmit a first user identification data to the on-token secure chip for verifying a user's identity, and to operably transmit a second user identification data to the on-card secure chip for verifying the user's identity; and
- a physiological characteristic detecting circuit coupled with the control circuit and arranged to operably detect the user's physiological characteristics;
- wherein the control circuit is further arranged to operably generate a first physiological characteristic data corresponding to a detecting result of the physiological characteristic detecting circuit and a second physiological characteristic data different from the first physiological characteristic data;
- the first user identification data comprises the host authentication data and the first physiological characteristic data, while the second user identification data comprises the host authentication data and the second physiological characteristic data;
- wherein if the user's identity is successfully confirmed by both the on-token secure chip and the on-card secure chip, the control circuit conducts a corresponding key backup operation or key restoration operation between the on-token secure chip and the on-card secure chip according to instructions by the host device.

* * * * *